(12) United States Patent
Nose et al.

(10) Patent No.: US 7,554,516 B2
(45) Date of Patent: Jun. 30, 2009

(54) DISPLAY DEVICE AND METHOD FOR DRIVING THE SAME

(75) Inventors: Masaki Nose, Kawasaki (JP); Junji Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 638 days.

(21) Appl. No.: 11/327,723

(22) Filed: Jan. 6, 2006

(65) Prior Publication Data

US 2006/0125750 A1 Jun. 15, 2006

Related U.S. Application Data

(60) Division of application No. 10/868,539, filed on Jun. 14, 2004, now Pat. No. 7,385,656, which is a continuation of application No. PCT/JP02/08554, filed on Aug. 26, 2002.

(30) Foreign Application Priority Data

Dec. 11, 2001 (JP) .............................. 2001-376603

(51) Int. Cl.
G09G 3/36 (2006.01)
(52) U.S. Cl. .............................. 345/88; 345/87; 349/74; 349/115
(58) Field of Classification Search ............. 345/22–24, 345/39, 45–48, 76–77, 87–88, 92–94, 589, 345/591, 593; 349/67, 115, 74
See application file for complete search history.

(56) References Cited

U.S. PATENT DOCUMENTS

| 5,463,482 | A | 10/1995 | Jones | 359/51 |
| 6,317,189 | B1 | 11/2001 | Yuan et al. | 349/176 |
| 6,580,482 | B1 * | 6/2003 | Hiji et al. | 349/115 |
| 6,654,080 | B1 | 11/2003 | Khan et al. | 349/73 |
| 7,385,656 | B2 * | 6/2008 | Nose et al. | 349/74 |

FOREIGN PATENT DOCUMENTS

| JP | 09-105900 | 4/1997 |
| JP | 9-503873 | 4/1997 |
| JP | 11-231339 | 8/1999 |
| JP | 2002202526 A | 7/2002 |

OTHER PUBLICATIONS

Davis, D. et al., "Multiple Color High Resolution Reflective Cholesteric Liquid Crystal Displays," Conference Record of the 1997 International Display Workshops on LCD Technology and Emissive Technology, Sep. 15, 1997, pp. 242-243.

* cited by examiner

*Primary Examiner*—Richard Hjerpe
*Assistant Examiner*—Mansour M Said
(74) *Attorney, Agent, or Firm*—Greer, Burns & Crain, Ltd.

(57) ABSTRACT

A display device displaying a color by mixing light reflected by a first reflection element 22 and light reflected by a second reflection element 26 by additive color mixture, in which the light of a first wavelength reflected by the first reflection element and light of a second wavelength reflected by the second reflection element have a mutually complementary color relationship. Thus, the display device, which can make good black and white display by a simple structure and can be driven by a simple method, can be realized.

3 Claims, 37 Drawing Sheets

WITH HIGH RESISTIVITY

WITH LOW RESISTIVITY

BEING APPLIED

AT PEAK

BEING APPLIED

AT PEAK

PLANAR STATE

FOCALCONIC STATE

DISPLAY DEVICE AND METHOD FOR DRIVING THE SAME

CROSS REFERENCE TO RELATED APPLICATIONS

This is a Divisional of application Ser. No. 10/868,539, filed Jun. 14, 2004 now U.S. Pat. No. 7,385,656, which is a Continuation of International Application No. PCT/JP02/08554, with an international filing date of Aug. 26, 2002, which designating the United States of America.

TECHNICAL FIELD

The present invention relates to a display device, more specifically a reflective display device, and a method for driving the same.

BACKGROUND ART

Generally, CRTs, transmittive liquid crystal displays with backlights are generally used in the display devices of computers and mobile devices. The displays of this type are the so-called emissive displays which include internal emission means.

Based on recent studies, it is proposed to preferably use non-emissive reflective display devices in terms of work efficiency and fatigue in reading texts, etc., on display. The reflective display device, which requires no internal emission means and uses natural light, etc. for display, is good for the eye and effective to decrease the electric power consumption.

To realize further lower electric power consumption, display devices having the memorization ability to retain displayed information even when their source power is turned off are expected.

As such display devices are proposed display devices using chiral nematic liquid crystals and cholesteric liquid crystals. Chiral nematic liquid crystals are liquid crystals comprising nematic liquid crystals and chiral catalysts added to the nematic liquid crystals. Chiral nematic liquid crystals and cholesteric liquid crystals have a characteristic of reflecting selectively light of specific wavelengths.

A proposed display device using a chiral nematic liquid crystal will be explained with reference to FIGS. 35A-B. FIGS. 35A-B are a schematic view of the proposed display device using a chiral nematic liquid crystal.

As shown in FIGS. 35A-B, a photo-absorbing layer 114 is formed on a substrate 110 of glass. An electrode 112 of ITO (Indium-Tin-Oxide) is formed on the photo-absorbing layer 114. A substrate 118 of glass is formed on the substrate 110 with the photo-absorbing layer 114 and the electrode 112 formed on, opposed to the substrate 110. An electrode 120 of ITO is formed on the side of the substrate 110, which is opposed to the electrode 112. A liquid crystal layer 122 of chiral nematic liquid crystal is provided between the substrate 110 with the photo-absorbing layer 114 and the electrode 112 formed on and the substrate 118 with the electrode 120 formed on. Thus, the display device using the chiral nematic liquid crystal is constituted.

A display device using a chiral nemtaic liquid crystal is disclosed in, e.g., Japanese published unexamined patent application No. Hei 06-507505.

Then, the operation of the display device using the chiral nematic liquid crystal will be explained.

FIG. 35A shows the planer state. In the planer state, that of the incident light, whose wavelength corresponds to a helical pitch of the liquid crystal molecules is reflected. A wavelength λ for a maximum on a reflection spectrum is expressed by $$\lambda = n \cdot p$$

wherein an average refractive index of the liquid crystal is represented by n, and a helical pitch of the liquid crystal is represented by p. Wavelength band width Δλ of reflected light is expressed by $$\Delta\lambda = \Delta n \cdot p$$

wherein an isotropy of refractive index of liquid crystal is represented by Δn.

FIG. 35B shows the focalconic state. In the focalconic state, the incident light passes through the liquid crystal layer 122 of the chiral nematic liquid crystal and is absorbed by the photo-absorbing layer 114 formed on the substrate 110. Accordingly, in the focalconic state, black color is displayed.

FIG. 36 is a graph of reflection spectra of the chiral nematic liquid crystal. The wavelengths are taken on the horizontal axis, and on the vertical axis reflectances are taken. The reflectances on the vertical axis were given when the reflection on a white reflection board is 100%.

The reflection wavelength of chiral nematic liquid crystals can be set at a prescribed value by suitably setting chiral catalyst amounts to be added to the cholesteric liquid crystals. The addition of larger amounts of chiral catalysts decreases the helical pitches p of the liquid crystals and shortens the wavelengths λ of the reflected light.

Chiral nematic liquid crystals have a characteristic of reflecting either of right circularly polarized light and left circularly polarized light. This is described in, e.g., SID 97 DIGEST, p. 1019-1022. Characteristics of the chiral catalysts to be added to the chiral nematic liquid crystals can set the chiral nematic liquid crystals to be right circularly polarized light or left circularly polarized light. Chiral nematic liquid crystals, which reflect either of the right circularly polarized light and the left circularly polarized light, theoretically has the upper limit of the reflectance of 50%.

Planer and focalconic states are retained substantially permanently unless an external force is applied to the liquid crystals. Accordingly, the use of chiral nematic liquid crystals can provide display devices having memorization ability which can retain displayed information even when their power sources are turned off.

As described above, chiral nematic liquid crystals, which can constitute reflective display devices and can retain displayed information even when the power sources are turned off, is noted as liquid crystals which will form the next generation display devices.

In a display device using a single layer of a chiral nematic liquid crystal, in the planer state, light of a wavelength corresponding to the helical pitch is selectively reflected, whereby the display colors are chromatic. On the other hand, in the focalconic state, the incident light is absorbed by the photo-absorbing layer, whereby the display color is black. Accordingly, the display device using the single layer of the chiral nematic liquid crystal can display chromatic colors or black color but cannot display white color.

Techniques of displaying white color by chiral nematic liquid crystals are proposed as follows.

Japanese published unexamined patent application No. Hei 09-503873 discloses the technique of mixing a plurality of kinds of chiral nematic liquid crystals, whereby all the visible spectra of 400-700 nm is covered to thereby display while color.

Japanese published unexamined patent application No. 2001-066627 discloses the technique of providing four liquid crystals of R (red), G (green), B (blue) and Y (yellow), whereby substantially all the visible spectra are covered to thereby display white color.

Japanese published unexamined patent application No. 2001-109012 discloses that chiral nematic liquid crystals of three colors, RGB are used to display white color.

Japanese published unexamined patent application No. Hei 11-231339 discloses that a chiral nematic liquid crystal layer which reflects selectively light of yellow color is formed on a photo-absorbing layer which absorbs light of blue color to display white color.

Techniques of display white color by using light scattering in focalconic state are also proposed.

However, the reflection wavelength band of chiral nematic liquid crystals has a full width at half maximum of about 70-110 nm. The display device disclosed in Japanese published unexamined patent application No. Hei 09-503873 cannot cover all the visible spectra only by mixing chiral nematic liquid crystals of, e.g., two kinds and accordingly cannot display white color. Furthermore, such display device, in which two or more kinds of liquid crystals are mixed in one polymer, has a risk that the liquid crystals might be mixed with one another.

The display devices disclosed in Japanese published unexamined patent application No. 2001-066627 and Japanese published unexamined patent application No. 2001-109012 both requires three or more liquid crystal layers, which is a blocking factor for the cost reduction. These display devices have high drive voltages, and their drive methods are complicated.

The display device disclosed in Japanese published unexamined patent application No. Hei 11-231339 has blue and white display colors. Accordingly, the visibility of the display devices is low unsuitable to read documents, such as texts, etc.

The technique of displaying white color by the scattering of light in focalconic state has the reflectance which is as low as about 20%, and bright white color display cannot be obtained. Accordingly, the display device using such technique cannot have high contrast.

As described above, none of the proposed techniques have been able to provide inexpensive display devices having good white and black displays.

Chiral nematic liquid crystals have a characteristic that as the observation angle is increased, the selective reflection wavelengths shift to the side of shorter wavelengths. Accordingly, in display devices using simply chiral nematic liquid crystals, hues of the display colors change depending on observation direction changes. FIG. 37 is a conceptual view of the observation angle change. For example, a display which is in red when observed at the front changes to green as the observation angle θ is increased, and changes to blue as the observation angle θ is further increased. For example, a display which is in green when observed at the front changes to blue as the observation angle θ is increased. Monitor display devices are required to have a ±60° visibility range. The hue change in the ±60° range is not preferable. Accordingly, techniques of reducing the hue changes corresponding to the observation angle changes have been expected.

DISCLOSURE OF INVENTION

An object of the present invention is to provide an inexpensive reflective display device which can make good black and white displays and has little hue change corresponding to the observation direction changes. Another object of the present invention is to provide a method for driving the display device, which is simple and can realize good displays.

The above-described object is attained by a display device displaying a color by mixing light reflected by a first reflection element and light reflected by a second reflection element by additive color mixture, in which the light having a first wavelength reflected by the first reflection element, and the light having a second wavelength reflected by the second reflection element have substantially mutually complementary color relationship.

The above-described object is also attained by a method for driving a display device including a first reflection element having a selective reflection wavelength in a 480-500 nm range and a second reflection element having a selective reflection wavelength in a 580-640 nm range, and displaying a color by mixing light reflected by the first reflection element and light reflected by the second reflection element by additive color mixture, in which a display state of the first reflection element and a display state of the second reflection element being both changed to switch between a white color display and a black color display.

The above-described object is also attained by a method for driving a display device including a first reflection element having a selective reflection wavelength in a 450-480 nm range and a second reflection element having a selective reflection wavelength in a 570-610 nm range, and displaying a color by mixing light reflected by the first reflection element and light reflected by the second reflection element by additive color mixture, in which a display state of the first reflection element being fixed, and a display state of the second reflection element being changed to switch between a white color display and a blue color display or between a yellow color display and a black color display.

According to the present invention, reflection lights reflected on two liquid crystal layers mutually have a complementary color relationship, whereby a display device which can realize good black and white display can be provided.

According to the present invention, the selective reflection wavelength of one of the liquid crystal layers is in a 480-500 nm range, and the other of the liquid crystal layers in a 580-640 nm range, whereby changes of the selective reflection wavelengths generated due to observation angle changes can be compensated. A display device which makes no substantial change in hues of the display colors even when the observation directions are changed can be provided.

According to the present invention, good black and white display can be realized by providing only two liquid crystal layers, whereby an inexpensive display device can be provided.

According to the present invention, the threshold voltages of the respective liquid crystal layers can be made substantially even, whereby a display device can have homogeneous display quality and much improved stability in the drive.

According to the present invention, the selective reflection wavelength of one of the liquid crystal layers is in a 450-480 nm range, and the selective reflection wavelength of the other of the liquid crystal layers is in a 570-610 nm range, whereby one alone of the liquid crystal layers is driven, whereby a display device which can make white-blue color display or yellow-black color display can be realized. Thus, the display device can have a simple structure and can be driven by a simple method.

According to the present invention, chiral nematic liquid crystals are used, whereby displayed information can be retained even when the electric power is turned off. Accordingly, the present invention can provide a display device whose electric power consumption is low and has memorization ability.

According to the present invention, one of the liquid crystal layers uses the R liquid crystal, which reflects right circularly polarized light, and the other liquid crystal layer uses the L liquid crystal, which reflects right circularly polarized light. Accordingly, even when a wavelength bans in which a reflection spectrum of one liquid crystal layer and a reflection spectrum of the other liquid crystal layer overlap each other present, light of a wavelength band which is reflected on one liquid crystal layer can be prevented from being reflected on the other liquid crystal layer. Thus, according to the present invention, when a reflection spectrum of one liquid crystal layer and a reflection spectrum of the other liquid crystal layer overlap each other, the decrease of the light reflection on either of the liquid crystal layers can be prevented, whereby the luminosity of the white color display can be increased.

According to the present invention, the liquid crystal layer of the R liquid crystal and the liquid crystal layer of the L liquid crystal are formed for the respective selective reflection wavelengths $\lambda_1$, $\lambda_2$, whereby both the right circularly polarized light and the left circularly polarized light can be reflected. Accordingly, the present invention can provide a display device which can reflect the incident light with high efficiency and can provide white color display of higher luminosity.

According to the present invention, the substrate and the partition layer are formed of film, whereby a display device which is flexible and can be used in extensive purpose.

According to the present invention, the thickness of the partition layer, etc. are so set that a phase difference between ordinary rays and extraordinary rays entering the liquid crystal layers is odd times $\lambda_2/2$, which permits good displays to be made even when films having birefringence are used.

According to the present invention, the thickness of the partition layer is so set that a phase difference between ordinary rays and extraordinary rays entering the liquid crystal layers is odd times $\lambda_2/2$, which permits good displays to be made even when the R liquid crystal and the L liquid crystal are combined.

According to the present invention, the liquid crystal layers are micro-capsuled, whereby chiral nematic liquid crystals are prevented from mixing with each other even without the use of a partition layer. According to the present invention, it is not necessary to use a partition layer, which permits a display device to be thinned.

BEST MODES FOR CARRYING OUT THE INVENTION

[The Principle of the Present Invention]

Figure 1:
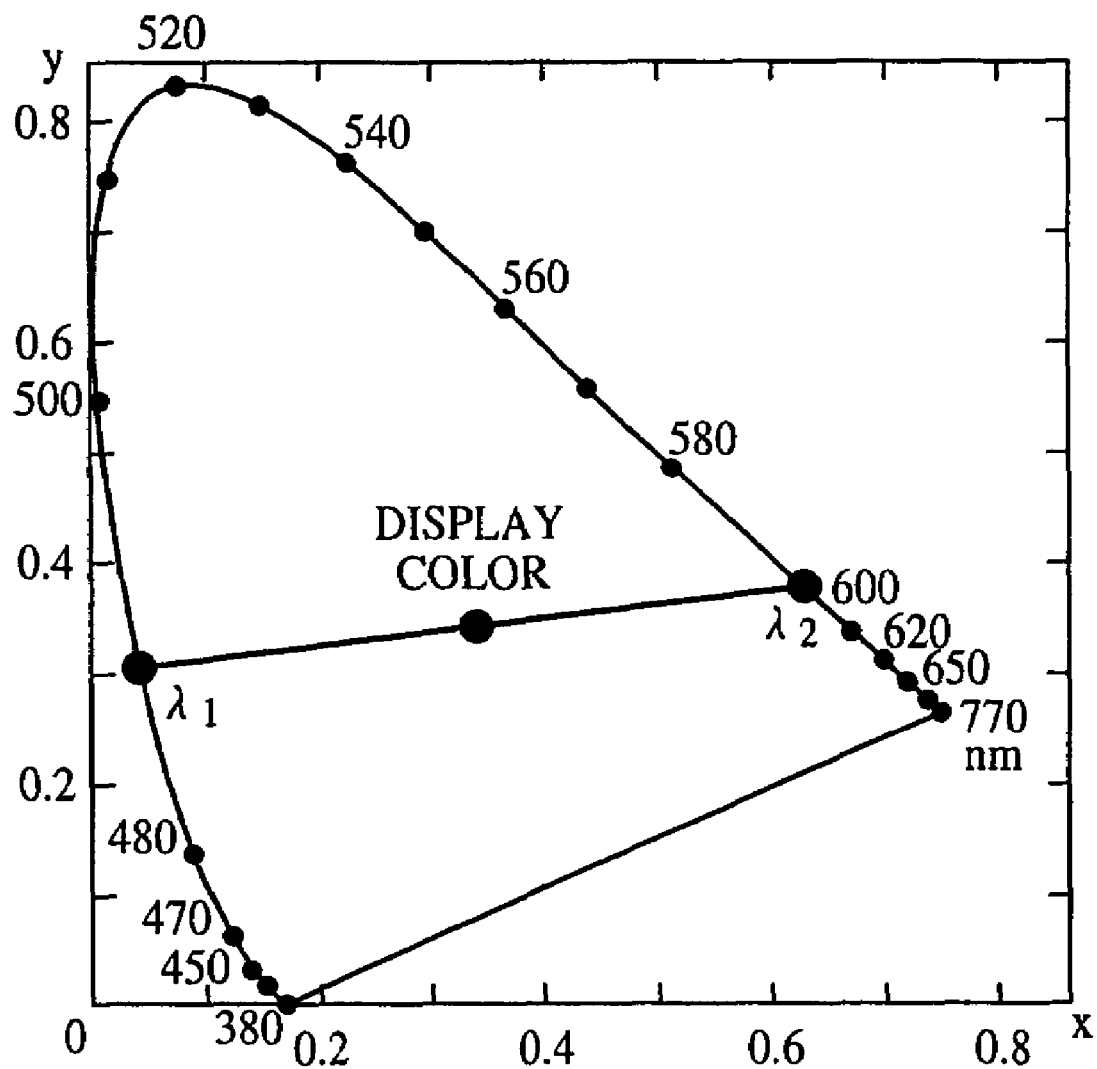
FIG. 1 is an xy chromaticity diagram explaining the principle of the present invention (Part 1).
Figure 2:
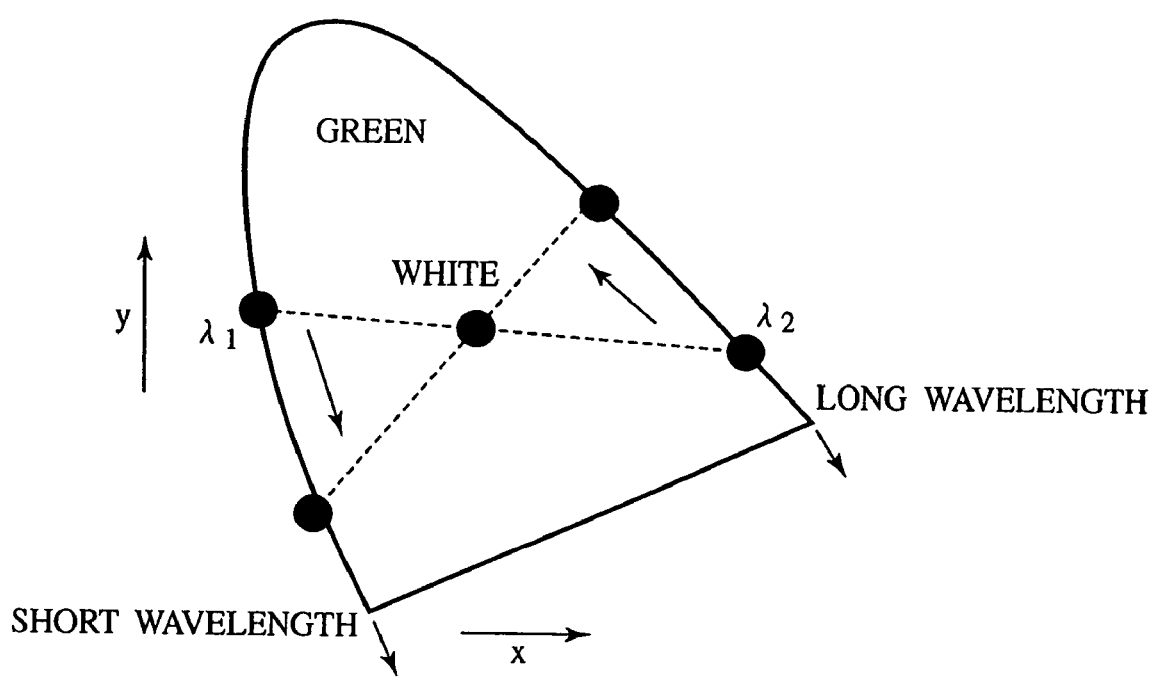
FIG. 2 is an xy chromaticity diagram explaining the principle of the present invention (Part 2).

The principle of the present invention will be explained with reference to FIGS. 1 and 2. FIGS. 1 and 2 are the xy chromaticity diagrams showing the principle of the present invention.

The inventors of the present invention have made earnest studies and discovered that two kinds of chiral nematic liquid crystals, one of which has a 480-500 nm selective reflection wavelength and the other of which has a 580-640 nm selective reflection wavelength, can be combined so that colors of light corresponding to the selective reflection wavelengths are complimentary colors to each other, whereby good black and while displays can be realized, and the hue changes of the display colors due to observation direction changes can be prevented.

A color produced by mixing 2 kinds of color light by additive color mixture is a color corresponding to the central coordinates of a line segment between two chromaticity coordinates in the xy chromaticity diagram. When a selective reflection wavelength $\lambda_1$ of one chiral nematic liquid crystal is, e.g. 490 nm, and a selective reflection wavelength $\lambda_2$ of the other chiral nematic liquid crystal is, e.g., 600 nm, the central coordinates of the line segment interconnection the two chromaticity coordinates is coordinates corresponding to white color. Accordingly, two kinds of chiral nematic liquid crystals colors of the light corresponding to selective reflection wavelengths of which have the complementary color relationship with each other are combined, whereby good white color can be displayed.

As shown in FIG. 2, as an observation angle is increased, selective reflection wavelengths $\lambda_1$, $\lambda_2$ of the chiral nematic liquid crystals respectively shift to the shorter wavelength side. The selective reflection wavelengths $\lambda_1$, $\lambda_2$ of the chiral nematic liquid crystals both shift to the shorter wavelength side, and the central coordinates of the line segment interconnecting the two chromaticity coordinates in the xy chromaticity diagram do not substantially change. Accordingly, even when the selective reflection wavelengths $\lambda_1$, $\lambda_2$ of the chiral nematic liquid crystals respectively shift to the shorter wavelength side, the influences of the changes of the selective reflection wavelengths $\lambda_1$, $\lambda_2$ on the display color are mutually compensated, and the hue of the display color given by the additive color mixture make no substantial change. Thus, chiral nematic liquid crystals having such selective reflection wavelengths $\lambda_1$, $\lambda_2$ are combined, whereby a display device hues of the display colors make no substantial change with changes of the observation directions can be provided.

In the above, the selective reflection wavelength $\lambda_1$ of one chiral nematic liquid crystal is 490 nm, and the selective reflection wavelength $\lambda_2$ of the other chiral nematic liquid crystal is 600 nm, but the combination of the selective reflection wavelengths of the chiral nematic liquid crystals is not essentially limited to the above. The selective reflection wavelength $\lambda_1$ of one chiral nematic liquid crystal is within a range of 480-500 nm, and the selective reflection wavelength $\lambda_2$ of the other chiral nematic liquid crystal is within a range of 580-640 nm. Furthermore, these two kinds of chiral nematic liquid crystals are combined so that colors of the light corresponding to these selective reflection wavelengths $\lambda_1$, $\lambda_2$ have the complementary color relationship. The selective reflection wavelength $\lambda_1$ of one chiral nematic liquid crystal must be within a range of 480-500 nm, and the selective reflection wavelength $\lambda_2$ of the other chiral nematic liquid crystal must be within a range of 580-640 nm, because unless the selective reflection wavelengths $\lambda_1$, $\lambda_2$ are within these ranges, the central coordinates of the line segment interconnection the two chromaticity coordinates cannot be coordinates corresponding to white color, and the display color given by the additive color mixture cannot be white color. Even if a display color near to white color is obtained, changes of the selective reflection wavelengths $\lambda_1$, $\lambda_2$ of the chiral nematic liquid crystals caused by observation direction changes cannot be mutually compensated, and the hue of the display color changes with observation direction changes.

As described above, according to the present invention, two kinds of chiral nematic liquid crystals whose reflection light mutually have the complementary color relationship are combined, whereby a display device which can display good white color can be provided. Furthermore, according to the present invention, the selective reflection wavelength of one chiral nematic liquid crystal is within a range of 80-500 nm, and the selective reflection wavelength of the other chiral nematic crystal is within a range of 580-640 nm, whereby changes of the selective reflection wavelengths of the chiral nematic liquid crystals due to observation direction changes can be compensated, whereby a display device whose hues of display colors make no substantial change even with observation direction changes can be provided. Furthermore, according to the present invention, only two kinds of chiral nematic liquids are used to display good black and white displays, whereby an inexpensive display device can be provided.

A FIRST EMBODIMENT

Figure 3:
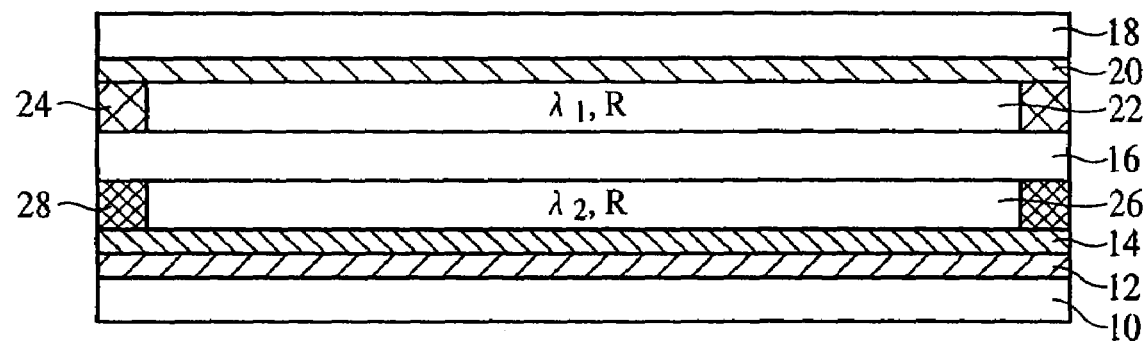
FIG. 3 is a sectional view of the display device according to a first embodiment of the present invention, which shows a structure thereof.

The display device according to a first embodiment of the present invention will be explained with reference to FIG. 3. FIG. 3 is a sectional view of the display device according to the present embodiment, which shows the structure thereof.

As shown in FIG. 3, an electrode 12 of a 0.1 μm-thick ITO is formed on a substrate 10 of glass. A photo-absorbing layer 14 of a 1 μm-thick is formed on the electrode 12. A 30 nm-thick partition layer 16 of glass is formed over the electrode 10, opposed to the substrate 10. A substrate 18 of glass is formed over the partition layer 16, opposed to the partition layer 16. An electrode 20 of ITO is formed on the side of the substrate 18, which is opposed to the partition layer 16.

For example, a 5 μm-thick liquid crystal layer 22 of a chiral nematic liquid crystal having a selective reflection wavelength $\lambda_1$ of 495 nm is formed between the substrate 18 with the electrode 20 formed on and the partition layer 16. The liquid crystal layer 22 is sealed with a sealing compound 24. The liquid crystal molecules of the chiral nematic liquid crystal are twisted right. The chiral nematic liquid crystal (hereinafter temporarily called "R liquid crystal") whose liquid crystal molecules are twisted right reflects only right circularly polarized light.

The chiral nematic liquid crystal forming the liquid crystal layer 22 can be formed by adding a chiral catalyst to a nematic liquid crystal. The nematic liquid crystal can be, e.g., E48 from Merck KGaA. The chiral catalyst can be, e.g., CB15 from Merck KGaA. This chiral catalyst has a characteristic of inducing liquid crystal molecules to twist right. The selective reflection wavelength $\lambda_1$ of the chiral nematic liquid crystal can be suitably set by adjusting the amount of the chiral catalyst to be added to the nematic liquid crystal.

A liquid crystal layer 26 of a chiral nematic liquid crystal of, e.g., a 5 μm-thick and a 601 nm selective reflection wavelength $\lambda_2$ is formed between the substrate 10 with the electrode 12 and the photo-absorbing layer 14 are formed and the partition layer 16. The liquid crystal layer 26 is sealed with a seal compound 28. The liquid crystal layer 26 is formed of the R liquid crystal. That is, the liquid crystal molecules of the chiral nematic liquid crystal forming the liquid crystal layer 26 are twisted right.

The chiral nematic liquid crystal forming the liquid crystal layer 26 can be formed by adding a chiral catalyst to a nematic liquid crystal, as described above. The nematic liquid crystal can be, e.g., E48 from Merck KGaA, as described above. The chiral catalyst can be, e.g., CB15 from Merck KGaA, as described above. The selective reflection wavelength $\lambda_2$ of the chiral nematic liquid crystal can be suitably set by adjusting the amount of the chiral catalyst to be added to the nematic liquid crystal.

The liquid crystal display according to the present embodiment, which includes the liquid crystal layer 22 having the selective reflection wavelength $\lambda_1$ on the side of the observation, and the liquid crystal layer 26 having the selective reflection wavelength $\lambda_2$ on the side of the photo-absorbing layer 14 is thus constituted.

Then, the operation of the display device according to the present embodiment will be explained.

In the focalconic state, the incident light passes through the liquid crystal layers 22, 26 and is absorbed by the photo-absorbing layer 14. Accordingly, in the focalconic state, the display color is black.

On the other hand, in the planer state, that of the incident light, which has wavelengths corresponding to helical pitches of the liquid crystal molecules of the liquid crystal layers 22, 26 are selectively reflected on the liquid crystal layers 22, 26. The selective reflection wavelength $\lambda_1$ of the liquid crystal layer 22 is 495 nm, and the selective reflection wavelength $\lambda_2$ of the liquid crystal layer 26 is 601 nm. Accordingly, the display color given by mixing the reflection light of the liquid crystal layers 22, 26 by the additive color mixture is white. Thus, in the planer state, the display color is white.

To change the chiral nematic liquid crystals of the liquid crystal layers 22, 26 from the focalconic state to the planer state, ac pulses of, e.g., 500 V and 100 Hz are applied between the electrodes 12, 20.

To change the chiral nematic liquid crystals of the liquid crystal layers 22, 26 from the planar state to the focalconic state, ac pulses of, e.g., 200 V and 100 Hz are applied between the electrodes 12, 20.

Generally, as the addition amount of the chiral catalyst is larger, the drive voltage tends to be higher. The chiral catalyst is added in a larger amount to the liquid crystal layer 22, whose selective reflection wavelength $\lambda_1$ is shorter than the liquid crystal layer 26, whose selective reflection wavelength $\lambda_2$, in a larger amount. Accordingly, the liquid crystal layer 26, whose selective reflection wavelength $\lambda_2$ is long, is changed from the focalconic state to the planer state with a lower applied voltage than in the case of the liquid crystal layer 22, whose selective reflection wavelength $\lambda_1$ is short. Accordingly, the chiral nematic liquid crystal alone of the liquid crystal layer 26 can be changed from the focalconic state to the planer state by suitably setting the voltage to be applied between the electrodes 12, 20. The voltage to be applied between the electrodes 12, 20 is suitably set, whereby a display device which can display not only black and while, but also chromatic colors corresponding to the selective reflection wavelength $\lambda_2$ can be provided.

(Evaluation Result)

Next, the results of the evaluation of the display device according to the present embodiment will be explained.

(a) Reflection Spectra upon White Color Display

Figure 4:
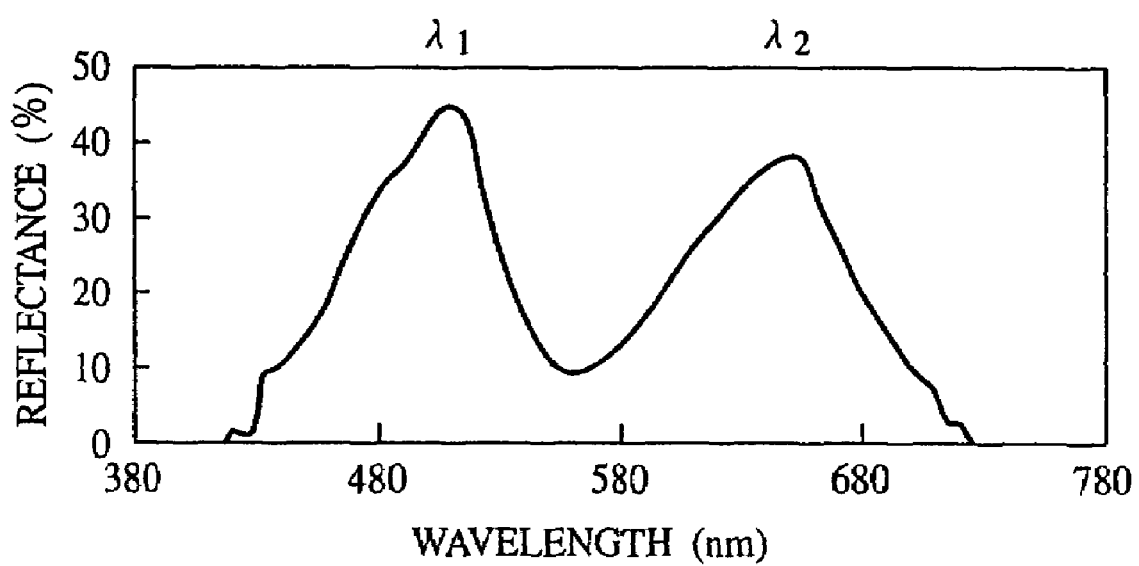
FIG. 4 is a graph of reflection spectra of the white color display of the display device according to the first embodiment of the present invention.

First, the reflection spectra upon the white color display will be explained. FIG. 4 is a graph of the reflection spectra when the display device according to the present embodiment displays white color. The wavelengths are taken on the horizontal axis, and the reflectances are taken on the vertical axis. A D65 light source was used in measuring the reflection spectra.

(b) Chromaticity upon White Color Display

Next, the chromaticity upon the white color display will be explained.

The chromaticity upon the white color display was measured, and the result was x=0.319 and y=0.367.

Based on this, it is found that the present embodiment can display good white color.

(c) Display Color Changes due to Observation Direction Changes

Next, the display color changes due to the observation direction changes will be explained.

The display color changes due to the observation direction changes were evaluated by changing the observation direction from 0° to 60° by 10° to obtain a maximum color difference Δu'v' in a u'v' uniform color space.

As Control 1, the maximum color difference Δu'v' was measured on a single liquid crystal layer which is arranged to display red color at an observation angle of 0°. The result was that the maximum color difference Δu'v' was 0.162 in Control 1.

As Control 2, the maximum color difference Δu'v' was measured on a single liquid crystal layer which is arranged to display green color at an observation angle of 0°. The result was that the maximum color difference Δu'v' was 0.146 in Control 2.

As Control 3, the maximum color difference Δu'v' was measured on a single liquid crystal layer which is arranged to display blue color at an observation angle of 0°. The result was that the maximum color difference Δu'v' was 0.133 in Control 3.

As an example, the maximum color difference Δu'v' was measured on the display device according to the present embodiment. The result was that the maximum color difference Δu'v' was 0.084.

Based on this, it can be seen that the display device according to the present embodiment can display colors which make no substantial change even with observation direction changes.

The present embodiment is thus arranged so that the reflection light on the liquid crystal layer 22 and the reflection light on the liquid crystal layer 26 mutually have the complementary color relationship, whereby the display device according to the present embodiment realize good black and white display.

Furthermore, the display device according to the present embodiment, in which the selective reflection wavelength $\lambda_1$ of the liquid crystal layer 22 is within a range of 480-500 nm, and the selective reflection wavelength $\lambda_2$ of the liquid crystal layer 26 is within a range of 580-640 nm, can compensate changes of the selective reflection wavelengths $\lambda_1, \lambda_2$ due to the observation angle change and makes no substantial change in the hues of the display colors even with observation direction changes.

According to the present embodiment, only two liquid crystal layers 22, 26 are provides, whereby good black and white display can be make, and the display device according to the present embodiment can be inexpensive.

According to the present embodiment, chiral nematic liquid crystals are used, whereby the display contents can be retained even when the power source turned off. Accordingly, the display device according to the present embodiment can have low electric power consumption and have memorization ability.

A SECOND EMBODIMENT

The display device according to a second embodiment of the present invention will be explained with reference to FIG. 5. The same members of the present embodiment as those of the display device according to the first embodiment shown in FIG. 3 are represented by the same reference numbers not to repeat or to simplify their explanation.

Figure 5:
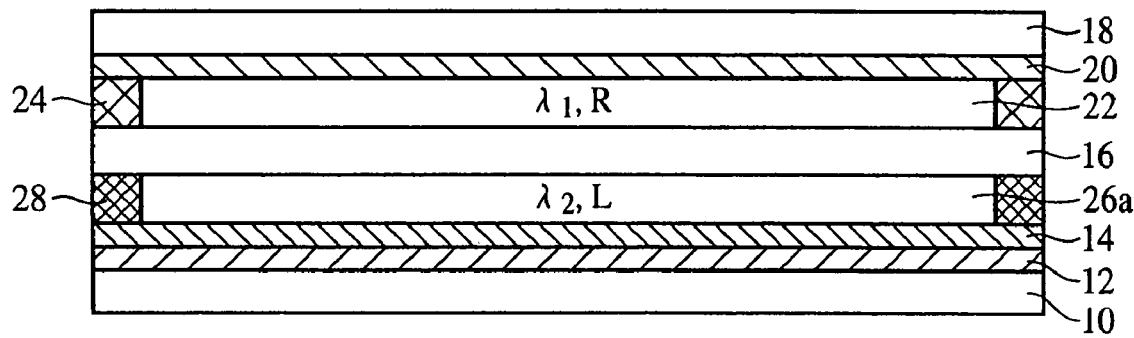
FIG. 5 is a sectional view of the display device according to a second embodiment of the present invention, which shows a structure thereof.

FIG. 5 is a sectional view of the display device according to the present embodiment, which shows the structure thereof.

The display device according to the present embodiment is characterized mainly in that one liquid crystal layer uses a chiral nematic liquid crystal whose liquid crystal molecules are twisted right, and the other liquid crystal layer uses a chiral nematic liquid crystal whose liquid crystal molecules are twisted left (hereinafter temporarily called "L liquid crystal").

As in the first embodiment, a liquid crystal layer 22 of the R liquid crystal is provided between a substrate 18 with an electrode 20 formed on and a partition layer 16.

On the other hand, a liquid crystal layer 26a of the L liquid crystal, which is a chiral nematic liquid crystal whose liquid crystal molecules are twisted left, is provided between a substrate 10 with an electrode 12 and a photo-absorbing layer 14 formed on and the partition layer 16. The selective reflection wavelength $\lambda_2$ of the liquid crystal layer 26a is set at, e.g., 601 nm. The thickness of the liquid crystal layer 26a is, e.g., 5 µm, as is the thickness of the liquid crystal layer 26 of the display device according to the first embodiment shown in FIG. 3. The chiral nematic liquid crystal is formed by adding a chiral catalyst to a nematic liquid crystal. The nematic liquid crystal can be, e.g., E48 from Merck KGaA, as described above. The chiral catalyst can be, e.g., S811 from Merck KGaA. This chiral catalyst has a characteristic which induces liquid crystal molecules to twist left. The selective reflection wavelength $\lambda_2$ of the chiral nematic liquid crystal can be suitably set by adjusting the amount of chiral catalyst to be added to the nematic liquid crystal.

Thus, the display device according to the present embodiment is constituted.

The display device according to the present embodiment is characterized mainly in that, as described above, one liquid crystal layer 22 is formed of the R liquid crystal and the other liquid crystal layer 26a is formed of the L liquid crystal.

In the display device according to the first embodiment, the incident light is reflected on the liquid crystal layer 22 in the wavelength band where the reflection spectra of the liquid crystal layer 22 and the reflection spectra of the liquid crystal layer 26 overlap each other and is not reflected substantially on the liquid crystal layer 26. Accordingly, in the display device according to the first embodiment, less light is reflected on the liquid crystal layer 26.

In the present embodiment, however, the liquid crystal layer 22 is formed of the R liquid crystal, which reflects right circularly polarized light, and the liquid crystal layer 26a is formed of the L liquid crystal, which reflect left circularly polarized light. In the present embodiment, even if the reflection spectra of the liquid crystal layer 22 and the reflection spectra of the liquid crystal layer 26a overlap each other is present, the light in the wavelength band where the light is reflected on the liquid crystal layer 26a is prevented from being reflected on the liquid crystal layer 22. Thus, according to the present embodiment, even when the reflection spectra of the liquid crystal layer 22 and the reflection spectra of the liquid crystal layer 26 overlap each other, the decrease of light to be reflected on the liquid crystal layer 26a can be prevented, whereby the luminosity of the white display can be increased.

(Evaluation Result)

Next, the results of the evaluation of the display device according to the present embodiment will be explained.

(a) Reflection Spectra upon the White Color Display

Figure 6:
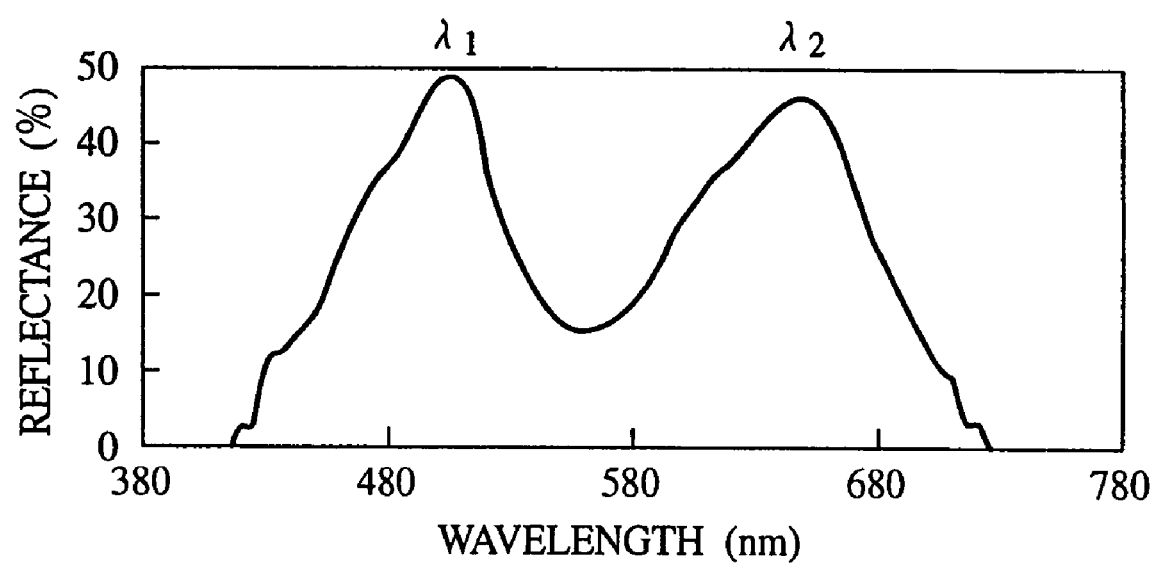
FIG. 6 is a graph of reflection spectra of the white color display of the display device according to the second embodiment of the present invention.

First, the reflection spectra upon the white color display will be explained with reference to FIG. 6. FIG. 6 is a graph of the reflection spectra upon the white color display. In measuring the reflection spectra, a D65 light source was used as in the first embodiment.

As shown in FIG. 6, in the present embodiment, higher reflectances were obtained in comparison with those of the reflection spectra of the display device according to the first embodiment.

In comparing the luminosity of the white color display, the display device according to the present embodiment had the luminosity of the white color display which was 1.4 times that of the display device according to the first embodiment.

Based on this, according to the present embodiment, the luminosity of the white color display can be higher.

(b) Chromaticity upon White Color Display

Then, the chromaticity upon the white color display will be explained.

The result of the chromaticity measured upon the white color display is x=0.328, y=0.350.

Based on this, according to the present embodiment, it is seen that good white color display can be obtained.

(Modification)

Figure 7:
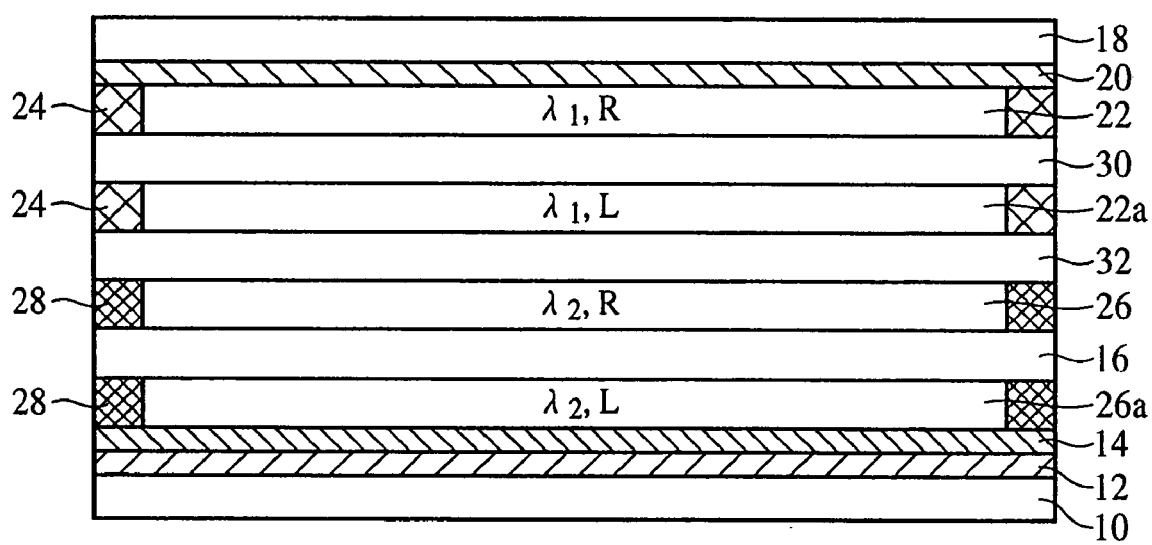
FIG. 7 is a sectional view of the display device according to one modification of the second embodiment of the present invention, which shows a structure thereof.

The display device according to one modification of the present embodiment will be explained with reference to FIG. 7. FIG. 7 is a sectional view of the display device according to the present modification, which shows the structure thereof.

The display device according to the present modification is characterized mainly in that the device includes four liquid crystal layers.

As shown in FIG. 7, partition layers 30, 32 are formed, spaced from each other between the substrate 18 with the electrode 20 formed on the partition layer 16.

A liquid crystal layer 22 is formed between the substrate 18 with the electrode 20 formed on and the partition layer 30. The liquid crystal layer 22 is formed of the R liquid crystal. The selective reflection wavelength $\lambda_1$ of the liquid crystal layer 22 is set at, e.g., 492 nm.

The liquid crystal layer 22a is formed between the partition layer 30 and the partition layer 32. The liquid crystal layer 22a is formed of the L liquid crystal. The selective reflection wavelength $\lambda_1$ of the liquid crystal layer 22a is set at, e.g., 492 nm.

A liquid crystal layer 26 is formed between the partition layer 32 and the partition layer 16. The liquid crystal layer 26 is formed of the R liquid crystal. The selective reflection wavelength $\lambda_2$ of the liquid crystal layer 26 is set at, e.g., 601 nm.

A liquid crystal layer 26a is formed between the substrate 10 with the electrode 12 and the photo-absorbing layer 14 formed on and the partition layer 16. The liquid crystal layer 26 is formed of the R liquid crystal. The selective reflection wavelength $\lambda_2$ the liquid crystal layer 26a is set at, e.g., 601 nm.

According to the present modification, liquid crystal layers 22, 26 of the R liquid crystal and the liquid crystal layers 22a, 26a of the L liquid crystal are formed respectively for the selective reflection wavelength $\lambda_1$ and the selective reflection wavelength $\lambda_2$, whereby both the right circularly polarized light and the left circularly polarized light can be reflected. Thus, the display device according to the present embodiment can reflect the incident light with higher efficiency and make brighter white color display.

A THIRD EMBODIMENT

The display device according to a third embodiment of the present invention will be explained with reference to FIG. 8. The same members of the present embodiment as those of the display device according to the first or the second embodiment shown in FIGS. 3 to 7 are represented by the same reference numbers not to repeat or to simplify their explanation.

Figure 8:
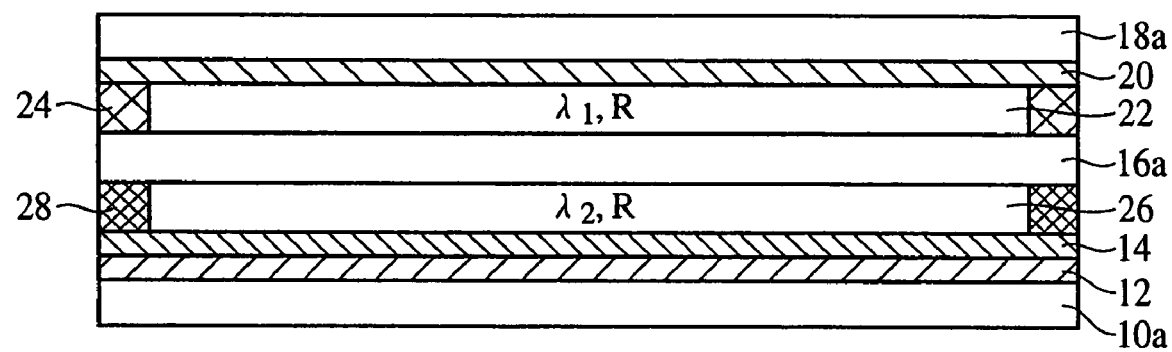
FIG. 8 is a sectional view of the display device according to a third embodiment of the present invention, which shows a structure thereof.

FIG. 8 is a sectional view of the display device according to the present embodiment, which shows the structure thereof.

The display device according to the present embodiment is characterized mainly in that the materials of the substrates and the partition layers are films.

As shown in FIG. 8, a substrate 10a of film, a partition layer 16a of film, and a substrate 18a of film are formed, opposed to each other.

A liquid crystal layer 22 is formed between the substrate 18a with an electrode 20 formed on and the partition layer 16a. The liquid crystal layer 22 is formed of the R liquid crystal. The selective reflection wavelength $\lambda_1$ of the liquid crystal layer 22 is set at, e.g., 492 nm.

A liquid crystal layer 26 is formed between the substrate 10a with an electrode 12 and a photo-absorbing layer 14 formed on and the partition layer 16a. The liquid crystal layer 26 is formed of the R liquid crystal. The selective reflection wavelength $\lambda_2$ of the liquid crystal layer 26 is set at, e.g., 601 nm.

In the display device according to the present embodiment, the materials of the substrates 10a, 18a and the partition layer 16a are films. Films generally have double refractivity. Accordingly, the simple use of films as the materials of the substrates 10a, 18a and the partition layer 16a cannot produce good display. In the present embodiment, the thickness, etc. of the partition layer 16a is suitably set so that the ordinary rays and the extraordinary rays entering the liquid crystal layer 26 have a phase difference which is odd times $\lambda_2/2$. The thickness, etc. of the partition layer 16a are set to satisfy such conditions, whereby good display can be realized even in a case that films having double refractivity are used.

The ordinary rays and the extraordinary rays entering the liquid crystal layer 26 are arranged to have a phase difference which is odd times $\lambda_2/2$, whereby the left circularly polarized light passing through the liquid crystal layer 22 and entering the partition layer 16a becomes right circularly polarized light when the former enters the liquid crystal layer 26. Accordingly, the liquid crystal layer 22 reflects the right circularly polarized light, but the liquid crystal layer 26 reflects the circularly polarized light which has been left wise when entering the partition layer 16a. Thus, according to the present embodiment, even if the reflection spectra of the liquid crystal layer 22 and the reflection spectra of the liquid crystal layer 26 overlap each other, the decrease of light to be reflected on the liquid crystal layer 26 can be prevented, and bright white color display can be obtained.

As described above, according to the present embodiment, the substrates 10a, 18a and the partition layer 16a are formed of films, whereby the display device can be used in flexibly wide applications.

According to the present embodiment, the thickness, etc. of the partition layer 16a are set so that the ordinary rays and extraordinary rays entering the liquid crystal layer 26 have a phase difference which is odd times $\lambda_2/2$, whereby the display device using even films having double refractivity can realize good display.

(Modification)

Figure 9:
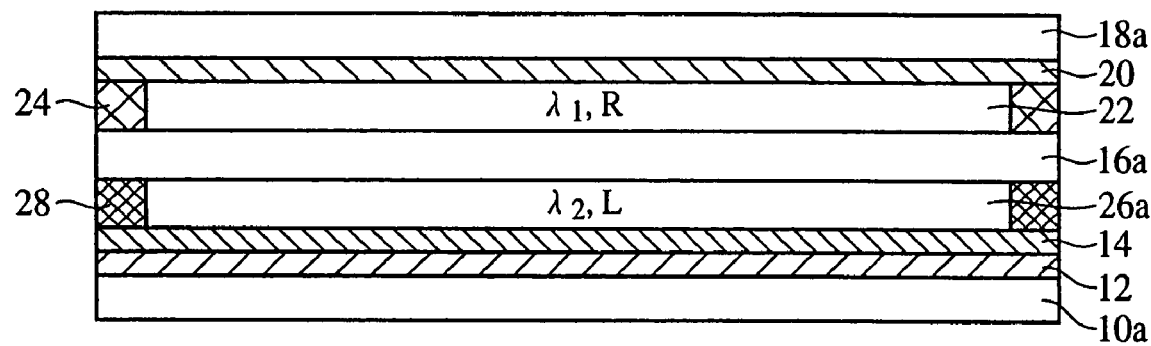
FIG. 9 is a sectional view of the display device according to one modification of the third embodiment of the present invention, which shows a structure thereof.

Then, the display device according to one modification of the display device according to the present embodiment will be explained with reference to FIG. 9.

The display device according to the present modification is characterized mainly in that the R liquid crystal and the L liquid crystal are used in combination.

As in the display device according to the third embodiment shown in FIG. 8, the liquid crystal layer 22 is formed between the substrate 18a with the electrode 20 formed on and the partition layer 16a. The liquid crystal layer 22 is formed of the R liquid crystal. The selective reflection wavelength $\lambda_1$ of the liquid crystal layer 22 is, e.g., 492 nm.

As in the display device according to the third embodiment shown in FIG. 8, the liquid crystal layer 26a is formed between the substrate 10a with the electrode 12 and the photo-absorbing layer 14 formed on and the partition layer 16a. The liquid crystal layer 26a is formed of the L liquid crystal. The selective reflection wavelength $\lambda_2$ of the liquid crystal layer 26a is, e.g., 601 nm.

According to the present modification, the thickness, etc. of the partition layer 16a is suitably set so that the ordinary rays and the extraordinary rays entering the liquid crystal layer 26a have a phase difference which is even times $\lambda_2/2$. The thickness, etc. of the partition layer 16a are set to satisfy such condition, whereby good display can be obtained even if films having double refractivity are used.

The thickness, etc. of the partition layer 16a are set so that a phase difference between the ordinary rays and the extraordinary rays entering the liquid crystal layer 26a is even times $\lambda_2/2$, whereby the left circularly polarized light passing through the liquid crystal layer 22 and entering the partition layer 16a remains left circularly polarized when entering the liquid crystal layer 26a. Accordingly, the liquid crystal layer 22 can reflect the right circularly polarized light, and the liquid crystal layer 26a can reflect the left circularly polarized light.

Thus, according to the present modification, even if the reflection spectra of the liquid crystal layer 22 and the reflection spectra of the liquid crystal layer 26 overlap each other, the decrease of light to be reflected on the liquid crystal layer 26a can be prevented, and bright white display can be obtained.

As described above, according to the present modification, the thickness, etc. of the partition layer 16a are set so that a phase difference between the ordinary rays and the extraordinary rays entering the liquid crystal layer 26a is even times $\lambda_2/2$, whereby even in the combination of the R liquid crystal and the L liquid crystal, good display can be realized.

A FOURTH EMBODIMENT

The display device according to a fourth embodiment of the present invention will be explained with reference to FIG. 10. The same members of the present embodiment as those of the display device according to the first to the third embodiments shown in FIGS. 1 to 9 are represented by the same reference numbers not to repeat or to simplify their explanation.

Figure 10:
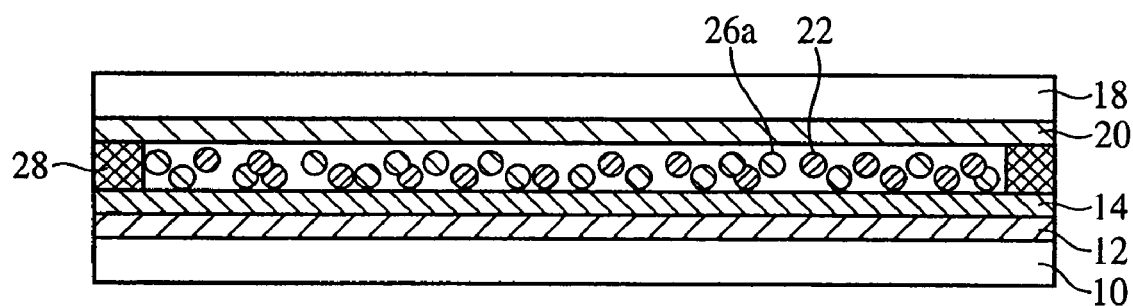
FIG. 10 is a sectional view of the display device according to a fourth embodiment of the present invention, which shows a structure thereof.

FIG. 10 is a sectional view of the display device according to the present embodiment, which shows the structure thereof.

The display device according to the present embodiment is characterized mainly in that a liquid crystal layer is in the form of microcapsules of chiral nematic liquid crystals.

As shown in FIG. 10, a liquid crystal layer 22 in the form of microcapsules and a liquid crystal layer 26a in the form of microcapsules are provided between a substrate 10 with an electrode 12 and a photo-absorbing layer 14 formed on and a substrate 18 with an electrode 20 formed on. The liquid crystal layer 22 is formed of the R liquid crystal whose selective reflection wavelength $\lambda_1$ is, e.g., 492 nm. The liquid crystal layer 26a is formed of the L liquid crystal whose selective reflection wavelength $\lambda_2$ is, e.g., 601 nm.

According to the present embodiment, the liquid crystal layers 22, 26a are in the form of microcapsules, which prevents without a partition layer the chiral nematic liquid crystals from mixing with each other. According to the present embodiment, the partition layer 16 is not required, which allows the display device to be thinner.

Furthermore, according to the present embodiment, the liquid crystal layer 22 is formed of the R liquid crystal, and the liquid crystal layer 26a is formed of the L liquid crystal, whereby even if the reflection spectra of the liquid crystal layer 22 and the reflection spectra of the liquid crystal layer 26a overlap with each other, the decrease of light to be reflected on the liquid crystal layer 22 or the liquid crystal layer 26a can be prevented, and good white display can be obtained.

A FIFTH EMBODIMENT

The display device according to a fifth embodiment of the present invention will be explained with reference to FIGS. 11 to 23. The same members of the present embodiment as those of the display device according to the first to fourth embodiments shown in FIGS. 3 to 10 are represented by the same reference numbers not to repeat or to simplify their explanation.

Figure 11:
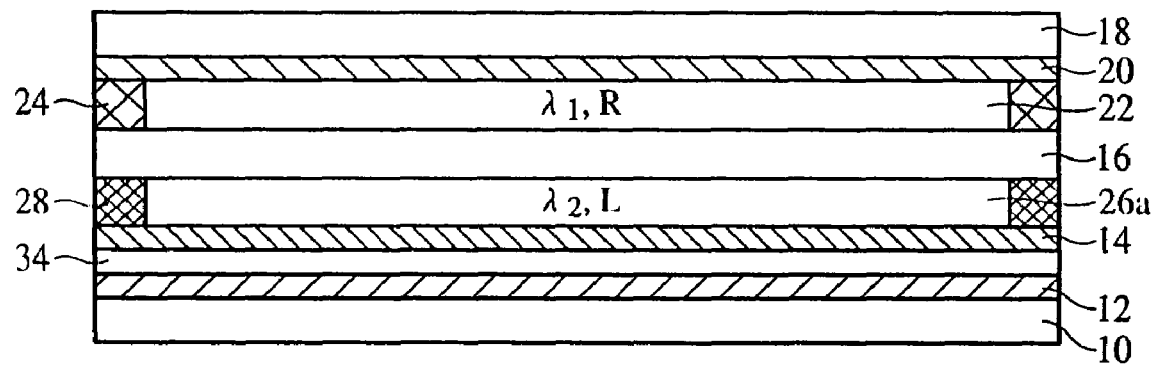
FIG. 11 is a sectional view of the display device according to a fifth embodiment of the present invention, which shows a structure thereof.

First, the display device according to the present embodiment will be explained with reference to FIG. 11. FIG. 11 is a sectional view of the display device according to the present embodiment, which shows the structure thereof.

An electrode 12 is formed on a substrate 10. A photoconductive layer 34 which generates charges by the application of light is formed. A photo-absorbing layer 14 is formed on the photoconductive layer 34. Over the photo-absorbing layer 14, a partition layer 16 is formed, sandwiching a liquid crystal layer 26a of the L liquid crystal. Over the partition layer 16 an electrode 20 is formed, sandwiching a liquid crystal layer 22 of the R liquid crystal. A substrate 18 is formed on the electrode 20. The liquid crystal layers 26a and the liquid crystal layer 22 are sealed respectively with seal compounds 28, 24.

The display device according to the present embodiment is characterized mainly in that the liquid crystal layer 22 and the liquid crystal layer 26a are substantially equal to each other in the threshold voltage. The effect produced by making the threshold voltages of the liquid crystal layers 22, 26a substantially equal to each other will be explained with reference to FIGS. 12 to 21.

Figure 12:
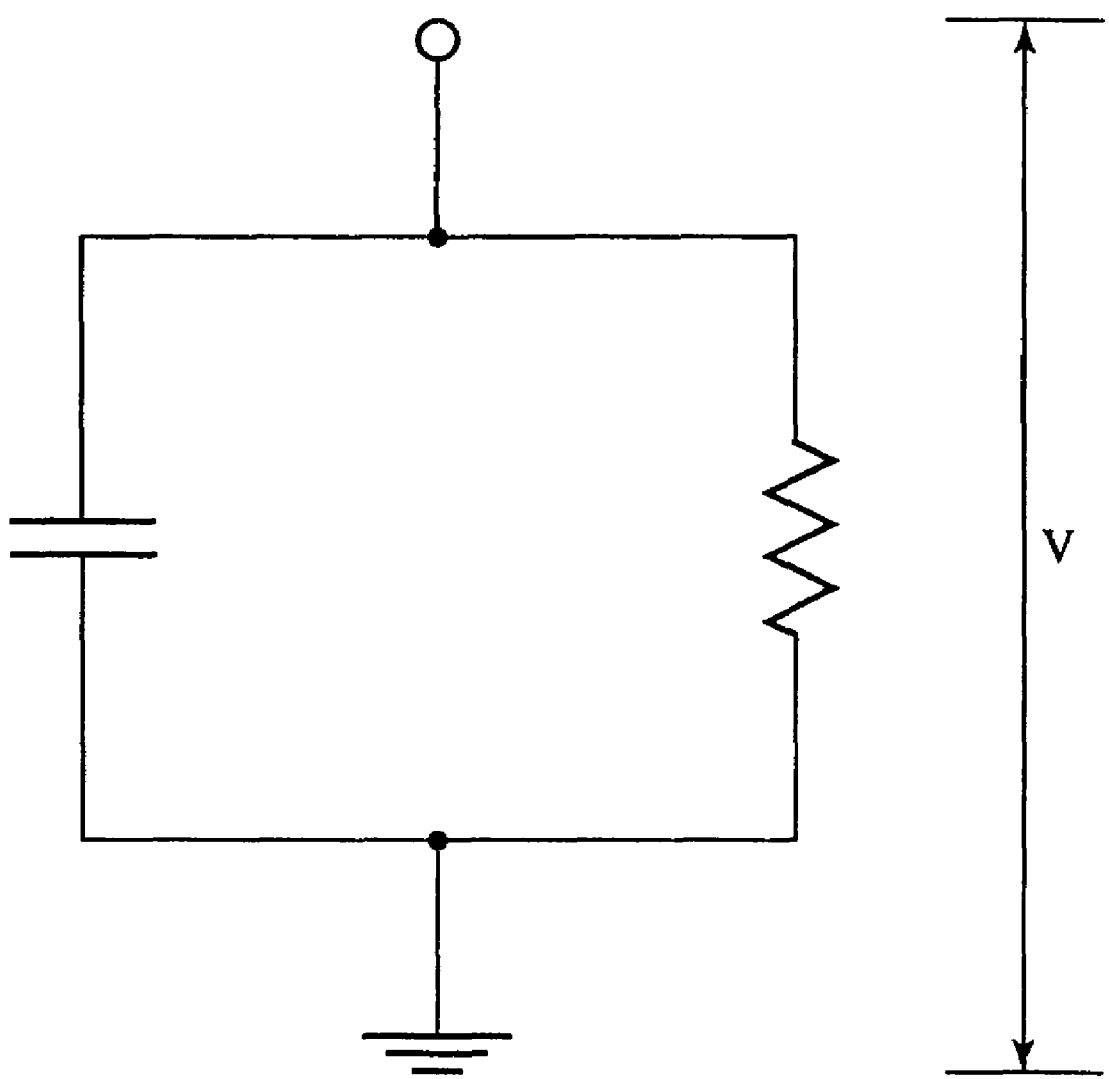
FIG. 12 is a circuit diagram of an equivalent circuit of a liquid crystal cell.
Figure 13:
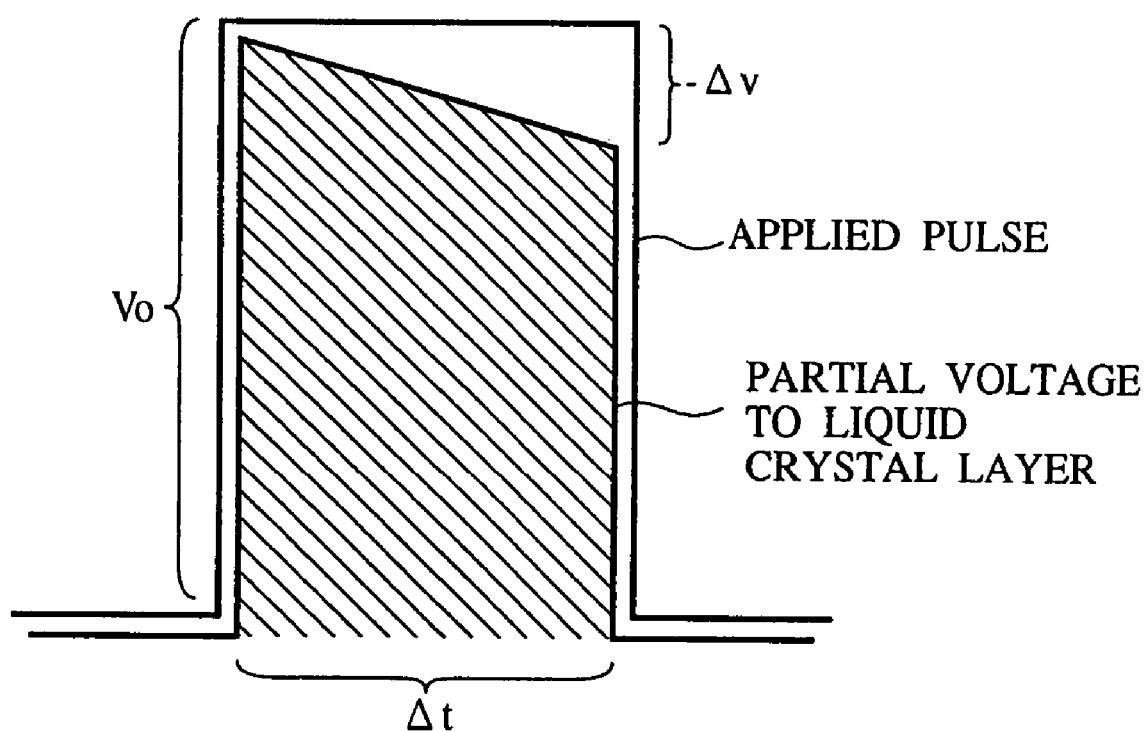
FIG. 13 is a view of relationships between an applied pulse and a voltage applied to the liquid crystal layers.
Figure 14A:
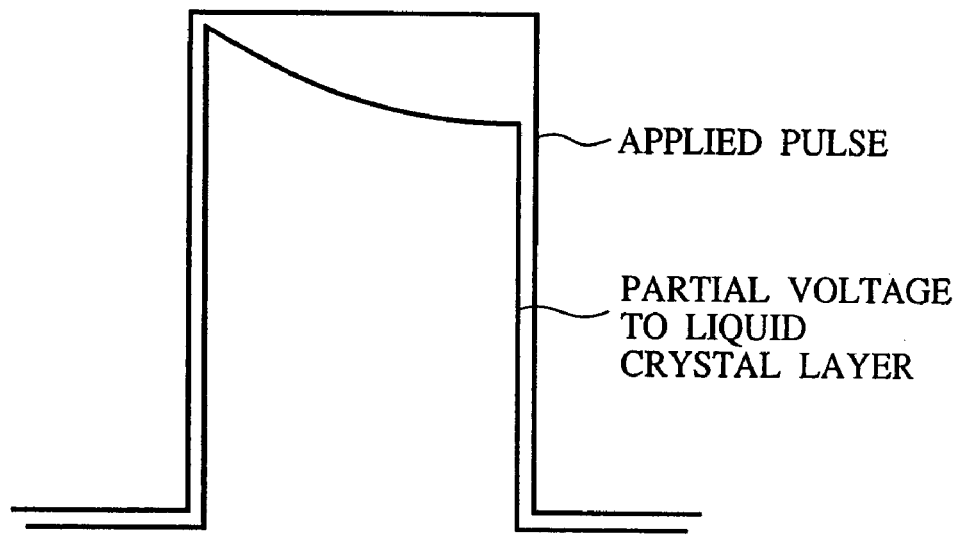
FIGS. 14A-B are views of relationships between the resistivity of the liquid crystal and a voltage applied to the liquid crystal layers.
Figure 14B:
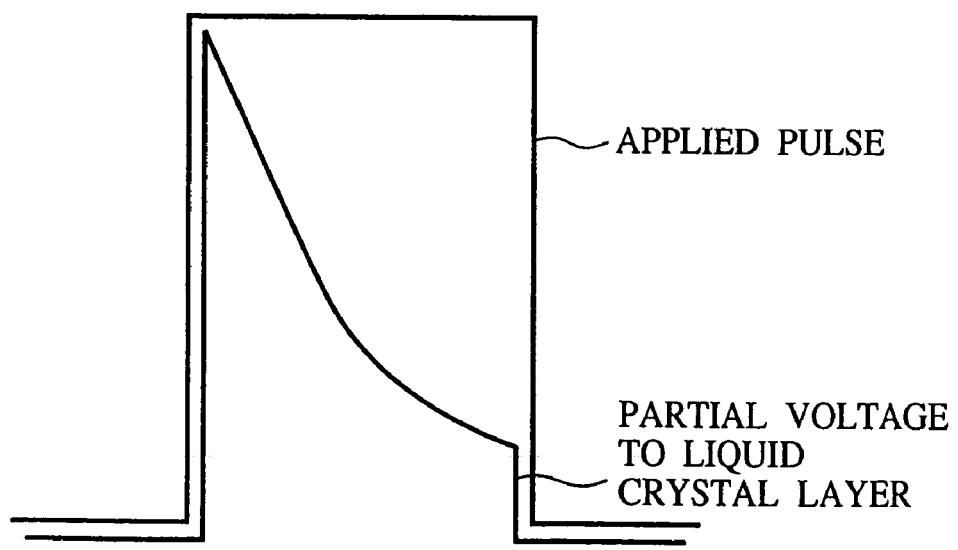
Figure 15A:
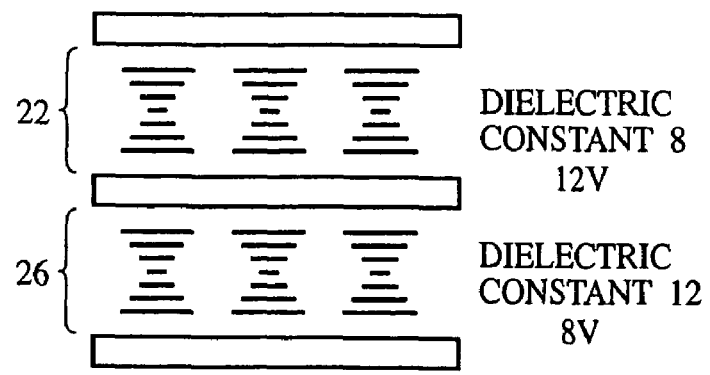
FIGS. 15A-B are views of state changes of the liquid crystal layers given when the threshold voltages of the liquid crystal layers are different from each other.
Figure 15A:
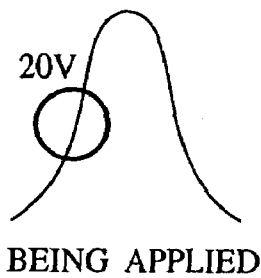
Figure 15B:
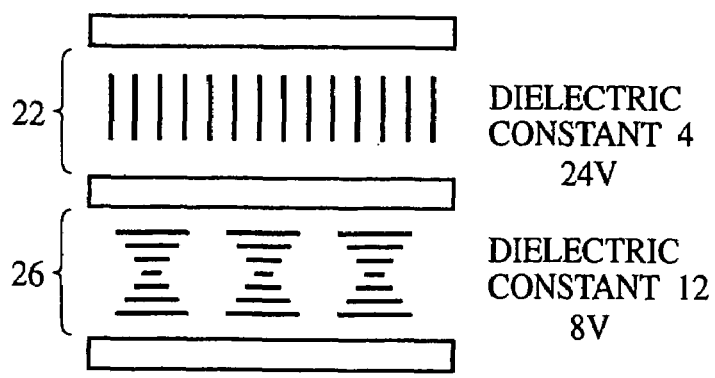
Figure 15B:
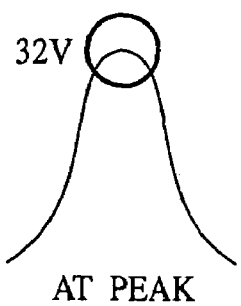
Figure 16A:
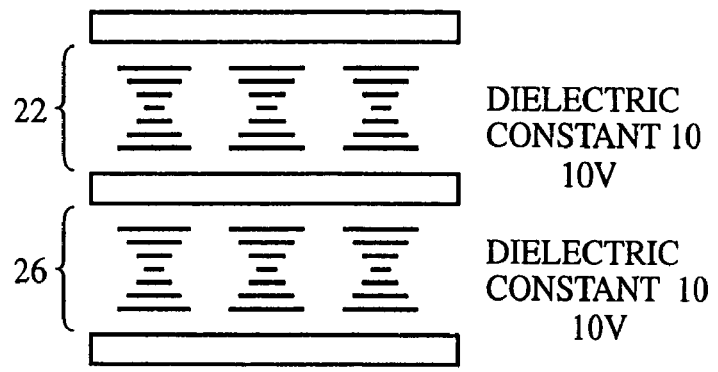
FIGS. 16A-B are views of state changes of the liquid crystal layers given when the threshold voltages of the liquid crystal layers are substantially equal to each other.
Figure 16A:
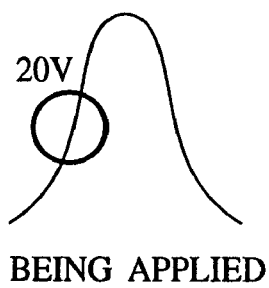
Figure 16B:
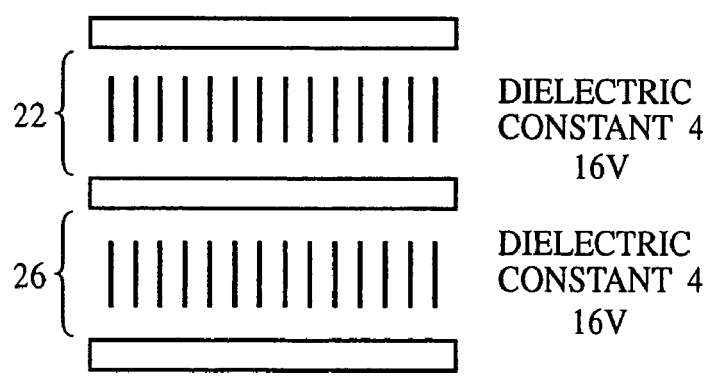
Figure 16B:
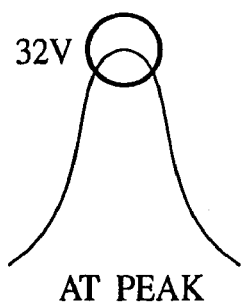
Figure 17A:
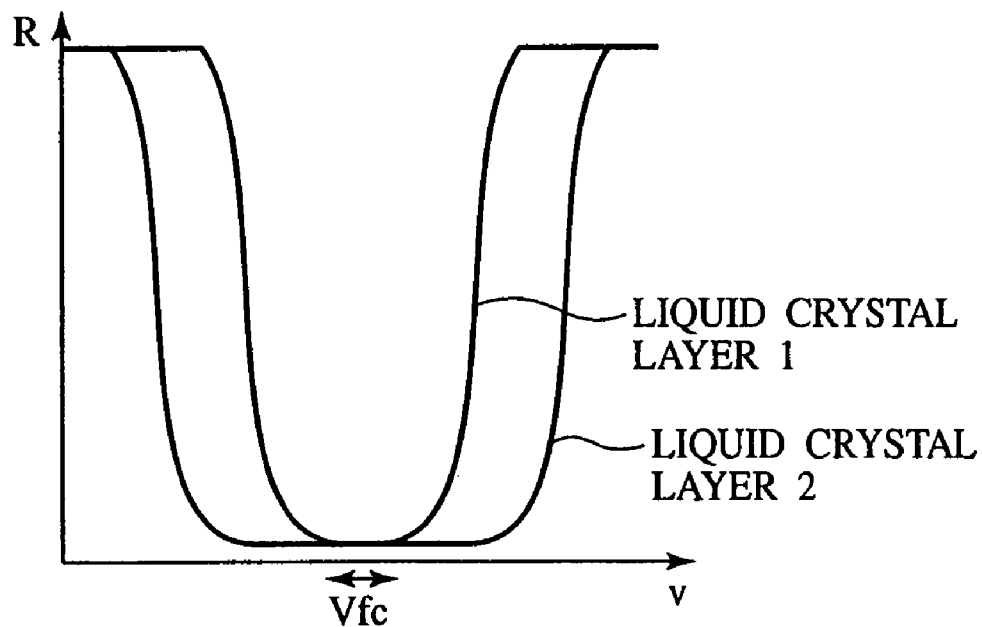
FIGS. 17A-B are graphs of the response characteristics of the liquid crystal layers given when the threshold voltage difference between the liquid crystal layers is large and small.
Figure 17B:
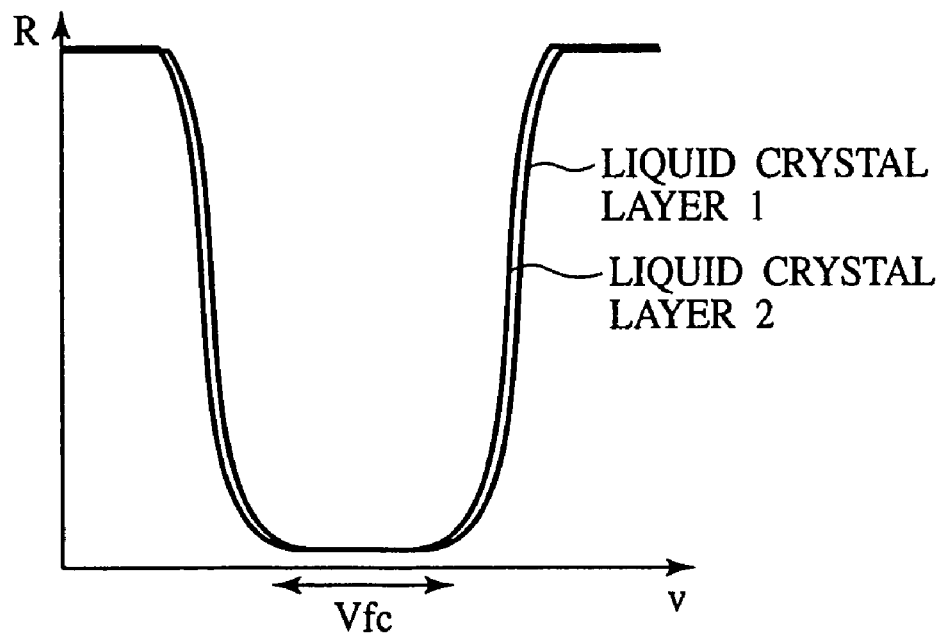
Figure 18A:
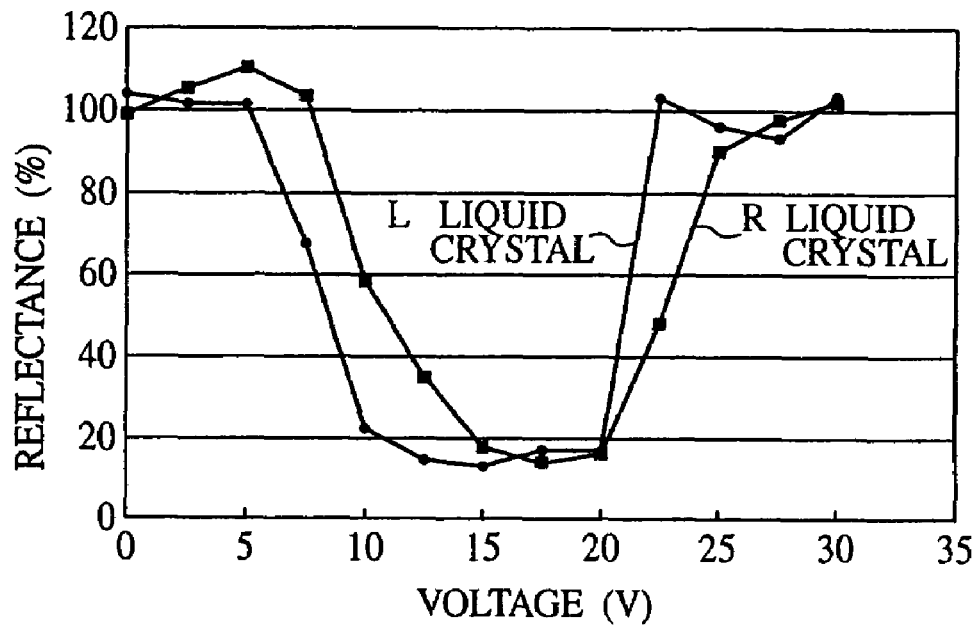
FIGS. 18A-B are graphs of the voltage characteristics of the respective liquid crystal layers containing no additive.
Figure 18B:
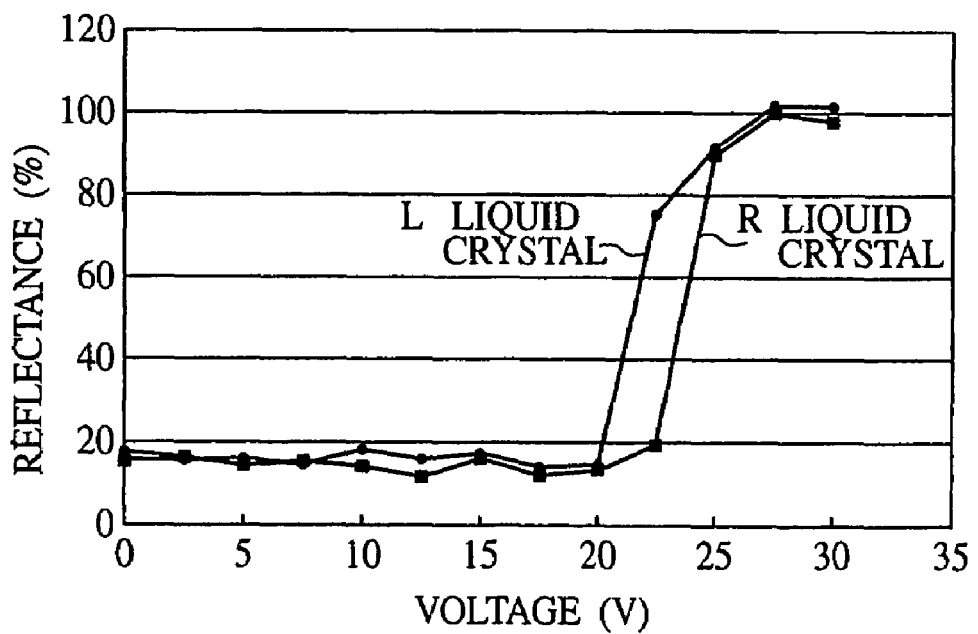
Figure 19:
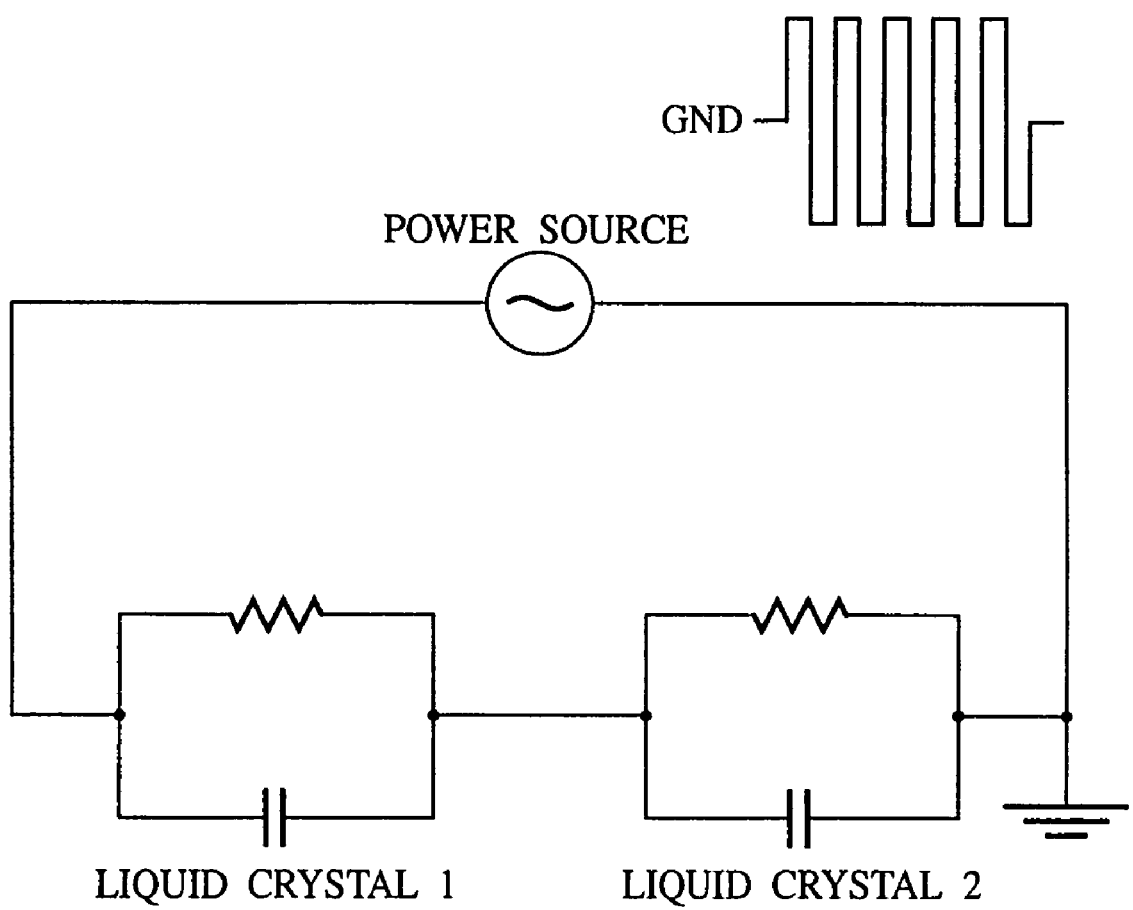
FIG. 19 is a circuit diagram used in measuring the partial voltage ratios of the respective liquid crystal layers.
Figure 20A:
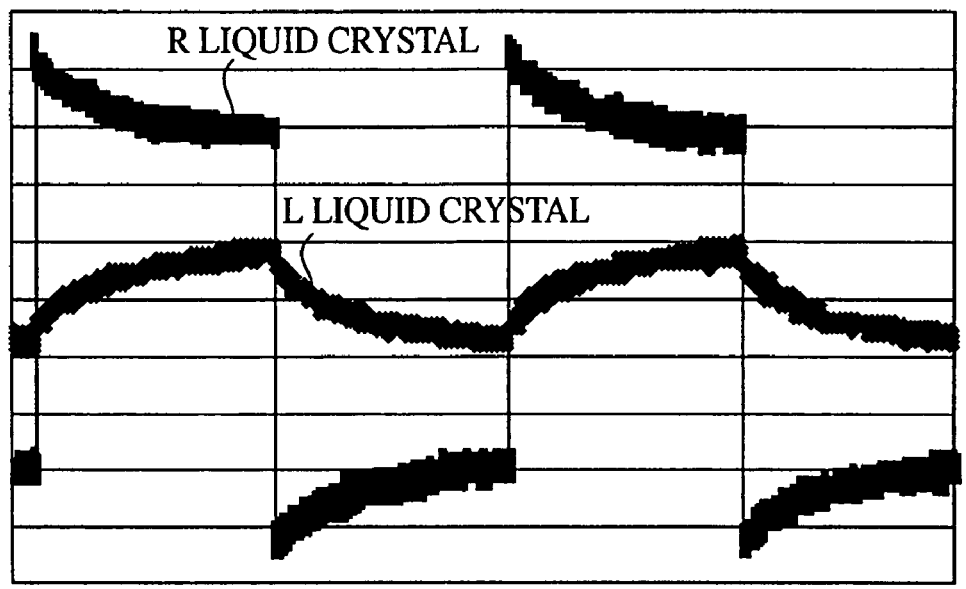
FIGS. 20A-B are graphs of the partial voltage ratios of the respective liquid crystal layers measured with ac pulses applied.
Figure 20B:
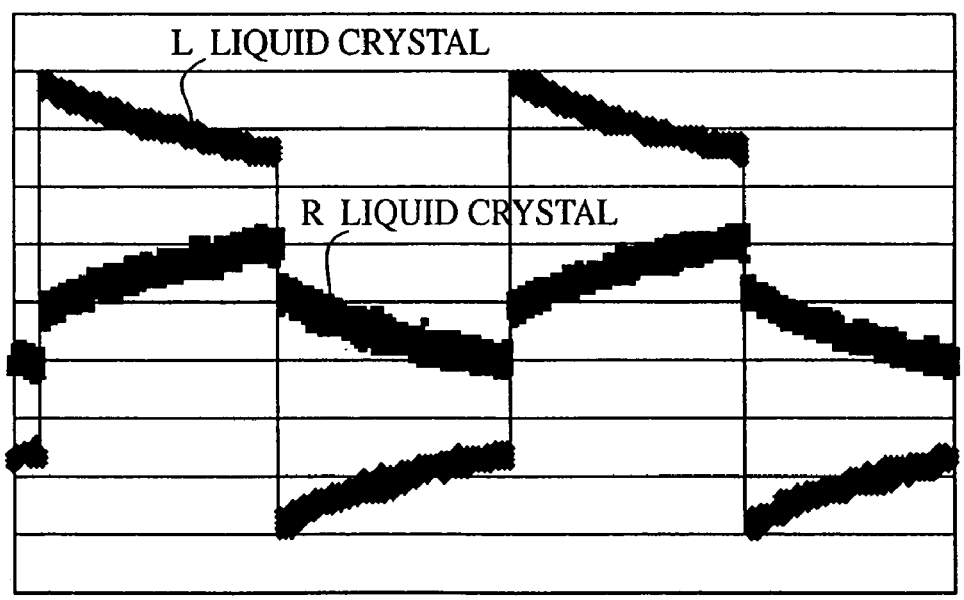
Figure 21:
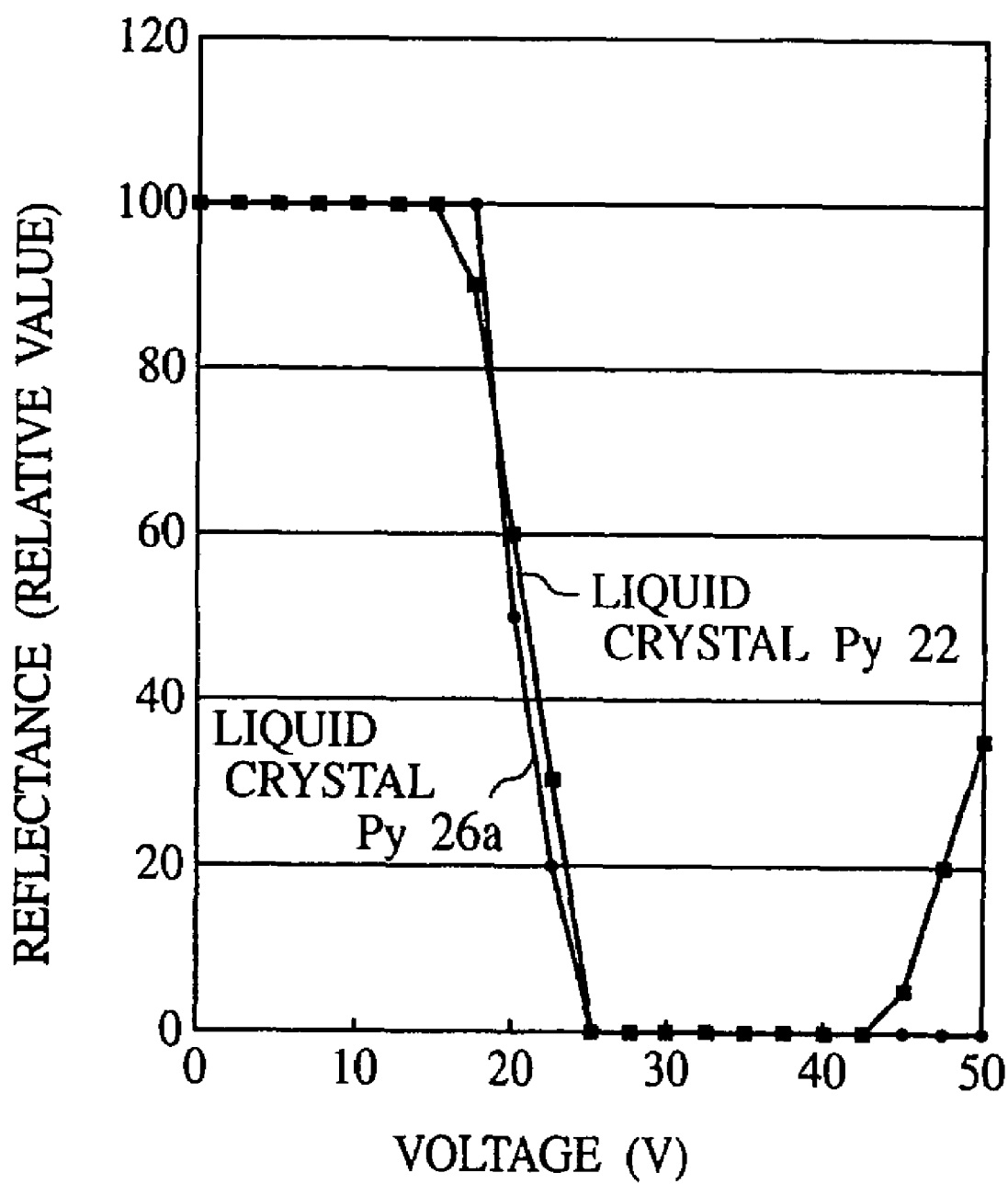
FIG. 21 is a graph of the measured voltage response of the display device according to the fifth embodiment of the present invention.

FIG. 12 is a circuit diagram of an equivalent circuit of a liquid crystal cell. FIG. 13 is a view of relationships between an applied pulse and a voltage applied to the liquid crystal layers. FIGS. 14A-B are views of relationships between the specific resistances of the liquid crystals and voltages applied to the liquid crystals. FIGS. 15A-B are views of changes of the states of the liquid crystal layers given when the threshold voltages of the liquid crystal layers are different from each other. FIGS. 16A-B are views of changes of the states of the liquid crystal layers given when the threshold voltages of the liquid crystal layers are substantially equal to each other. FIGS. 17A-B are graphs of the response characteristics of the liquid crystal layers given when the threshold voltage difference between the liquid crystal layers is large and small. FIGS. 18A-B are graphs of the voltage characteristics of the liquid crystal layers containing no additive. FIG. 19 is a circuit diagram used in measuring the partial voltage ratio of the respective liquid crystal layers. FIGS. 20A-B are graphs of the partial voltage ratios of the respective liquid crystal layers measured with alternate pulses are applied. FIG. 21 is a graph of the voltage response of the display device according to the present embodiment.

In the display device according to the first to the fourth embodiments, two or more liquid crystal layers are driven by a pair of electrodes. However, when the threshold voltages of the respective liquid crystal layers are different from each other, a contrast sufficiently utilizing the potentials cannot be provided.

The threshold electric field strength $E_{CN}$ of chiral nematic liquid crystal is given by $$E_{CN} = (\pi^2/P_o) \times (K22/\epsilon_0 \Delta\epsilon)^{1/2}$$

wherein $P_o$ represents a helical pitch; $K_{22}$, an elasticity constant of twists; $\Delta\epsilon$, a dielectric constant anisotropy; and $\epsilon_0$, a vacuum dielectric constant. That is, there is a relationship that as the dielectric anisotropy is higher, the drive voltage is lower. The dielectric anisotropy means that the dielectric constant of liquid crystal molecules varies depending on a dielectric constant difference due to directions of the axis of the liquid crystal molecules, i.e., alignment states. In chiral nematic liquid crystals as well, the above-described planer state, focal conic state and homeotropic state have dielectric constants which are much different from each other. In the general liquid crystals, whose dielectric anisotropy is positive, the dielectric constant is maximum in the planer state, and minimum in the homeotropic state.

Liquid crystals are not pure insulating films and have a property of passing a little current due to actions of ions, etc. generated inside. Accordingly, in an electric circuit equivalent to a liquid crystal cell, a liquid crystal cell can be substituted by the electric circuit having a capacitor and a resistor connected in parallel as shown in FIG. 12.

Because of such property of liquid crystals, the voltage transition of a liquid crystal sandwiched between electrodes is as shown in FIG. 13. The initial value $V_0$ shown on the left in FIG. 13 corresponds to a value of a dielectric constant of the capacitor. As the initial value $V_o$ is larger, a higher voltage is required to charge the capacitor, and it means that the dielectric constant is low. The value of $-\Delta v/\Delta t$, $V_0-\Delta v$ depends on the specific resistance value of the liquid crystal.

That is, as shown in FIG. 14A, when the specific resistance of the liquid crystal is relatively high, the value of $\Delta v$ is small, and the holding ability of the voltage is good. On the other hand, as shown in FIG. 14B, the holding ability of the voltage is degraded as the specific resistance value of the liquid crystal is smaller, which is a barrier to the drive. Such specific resistance decrease is affected mainly by ions, etc. present in the liquid crystal.

Accordingly, when two liquid crystal layers, which are different in the dielectric constant anisotropy and the specific resistance, are sandwiched by a pair of electrodes, the following phenomena will take place when driven.

When a voltage is applied to the liquid crystal layers, more of the voltage is divided to that of the liquid crystal layers, which has a smaller absolute value of the dielectric constant. For example, when a 20 V voltage is applied to the layer structure of a liquid crystal layer 22 having a dielectric constant of 8 in the planer state and a liquid crystal layer 26 having a dielectric constant of 12 in the planer state, as shown in FIG. 15A, a 12 V voltage is applied to the liquid crystal layer 22, and an 8 V voltage is applied to the liquid crystal layer 26.

When the applied voltage is further increased, the liquid crystal layer 22, to which more of the voltage is divided, reaches the threshold voltage and changes from the planer state to the homeotropic state. The liquid crystal layer 22 has, e.g., a dielectric constant of 4 in the homeotropic state. Accordingly, as shown in FIG. 15B, even when the voltage to be applied to the layer structure is increased to, e.g., 32 V, the voltage to be applied to the liquid crystal layer 26 is 8 V, which is lower than the threshold voltage, and only the voltage to be applied to the liquid crystal layer 22 is increased to 24 V. Thus, when the dielectric constants of the liquid crystal layers are different from each other, it is very difficult to concurrently change states of both the liquid crystal layers.

On the other hand, when the dielectric constants of the liquid crystal layers 22, 26 are equal to each other, as shown in FIGS. 16A and 16B, voltages to be applied to the liquid crystal layers 22, 26 are substantially equal to each other, and states of both the liquid crystal layers can be concurrently changed.

Accordingly, when a pair of electrodes are used, in order to concurrently change states of a plurality of liquid crystal layers, i.e., make the threshold voltages substantially equal to each other, the dielectric constants of the respective liquid crystal layers are made as equal to each other as possible, and the specific resistances as well are made as equal to each other as possible.

FIG. 17 is graphs of the response characteristics of the liquid crystal layers given when the threshold voltage difference between the liquid crystal layers is large and small. As shown in FIG. 17A, when a threshold voltage difference is present between the liquid crystal layer 1 and the liquid crystal layer 2, a movable range Vfc where both are turned into the focalconic state is small, but as shown in FIG. 17B, when the threshold voltages of the liquid crystal layer 1 and the liquid crystal layer 2 are substantially equal to each other, the movable range Vfc is wide, and the display quality and drive stability can be much improved.

Next, the method for controlling the threshold voltages of the liquid crystal layers will be explained by means of examples.

As a liquid crystal which reflects the right circularly polarized light (the R liquid crystal), a suitable amount of a chiral catalyst CB15 for exciting the right helical structure is added to a liquid crystal E48 from Merck KgaA to prepare a liquid crystal of a 492 nm dominant reflection wavelength. As a liquid crystal which reflects the left circularly polarized light (the L liquid), a suitable amount of a chiral catalyst S811 for exciting the left helical structure was added to a liquid crystal E48 from Merck KGaA to prepare a liquid crystal of a 601 nm dominant reflection wavelength.

FIG. 18 shows the voltage characteristics of the discrete liquid crystals. FIG. 18A shows the response characteristics of the liquid crystals changing from the planer state to the focalconic state. FIG. 18B shows the response characteristics of the liquid crystals changing from the focalconic state to the planer state. As shown, the L liquid crystal, which has a little lower amount ratio of the chiral catalyst, has a little lower drive voltage and oppositely the R liquid crystal, which has a higher amount ratio of the chiral catalyst, has a little higher drive voltage. A chiral nematic liquid crystal has a lower specific resistance and a higher drive voltage as the addition amount of a chiral catalyst is larger.

Then, to electrically simulate the layer state of the liquid crystals, as shown in FIG. 19, glass cells are serially connected, ac pulses were applied, and the partial voltages of the respective liquid crystals were investigated. The result is shown in FIG. 20. As shown in FIG. 20A, more of the voltage is divided to the R liquid crystal, which has a larger amount ratio of the chiral catalyst and has a low absolute dielectric constant, has a low apparent threshold voltage. Then, an about 3% of a surfactant was added to the L liquid crystal. The result is that, as shown in FIG. 20B, the addition of the surfactant could reverse the relationship of the partial voltage ratio. That is, the addition of a surfactant can much change properties of the liquid crystal layers, such as dielectric constant and specific resistance.

Based on these results, a liquid crystal layer 26a of the display device according to the present embodiment shown in FIG. 11 comprises the L liquid crystal and 1.2% of a surfactant, TN-40 (from Asahi Denka Co., Ltd.). The film thicknesses of the respective liquid crystal layers 22, 26a were 3 μm. The film thickness of a photoconductive layer 34 was 10 μm.

The voltage response characteristic of the thus-constituted display device according to the present embodiment was measured. The result is shown in FIG. 21. The threshold voltages of the liquid crystal layer 22 and the liquid crystal layer 26a are substantially in agreement with each other, and good response characteristics could be realized.

Next, ac pulses of 500 V and 100 Hz were applied to this display device, and both liquid crystal layers 22, 26a had the planer state. In the planer state, the color mixture between the two layers produced good white display.

Then, with a negative image mask applied to the surface on the side of the photoconductive layer 34, dc pulses of 80 V were applied generally to the device while light is being applied. The two liquid crystal layers in regions to which the light has been applied to concurrently changed to the focalconic state and retained the planer state in regions to which the light has not been applied. Vivid black and white display of high contrast could be made.

Figure 22:
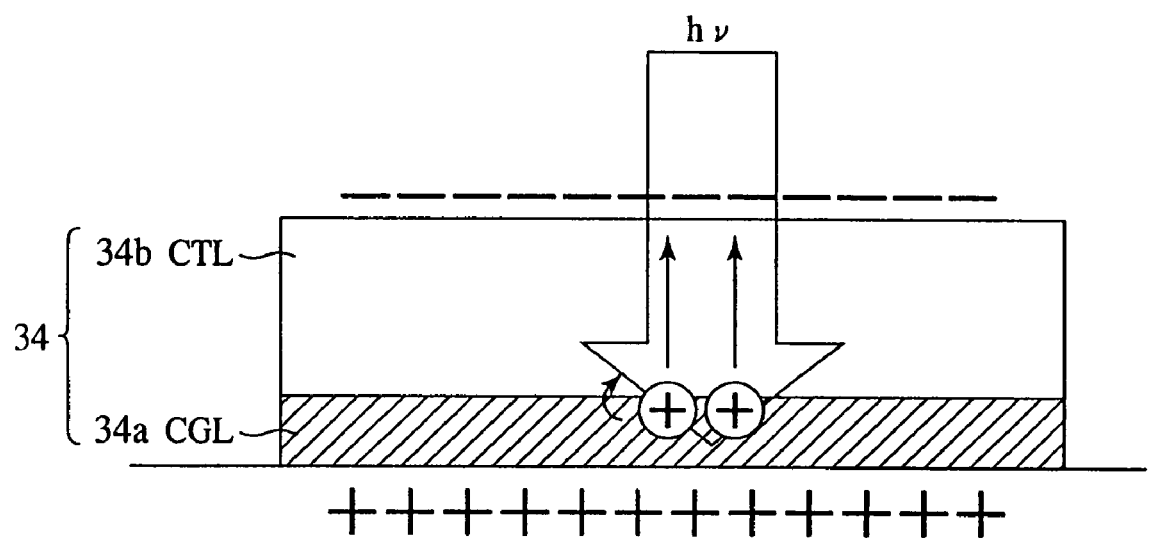
FIG. 22 is a view explaining the structure and the operation of the photoconductive layer.
Figure 23A:
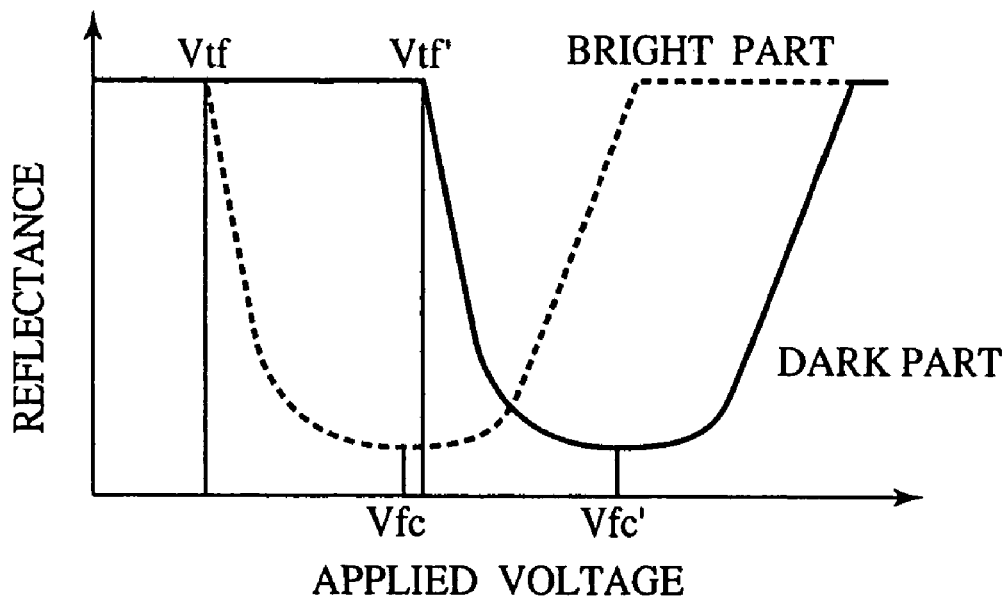
FIGS. 23A-B are graphs showing the principle of the optical writing method using the photoconductive layer.
Figure 23B:
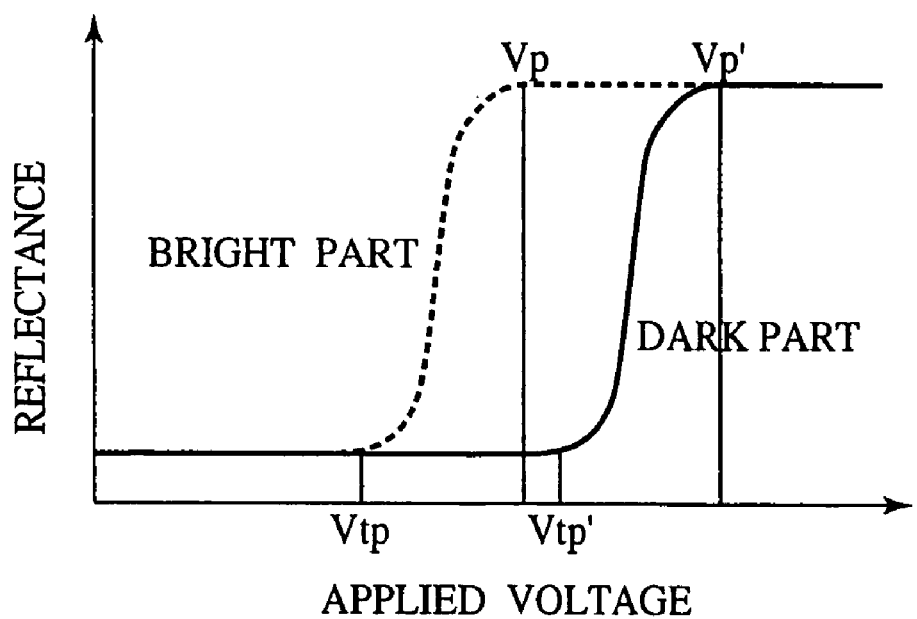

Here, the mechanism for optical writing using the above-described photoconductive layer 34 will be explained with reference to FIGS. 22 and 23A-B. FIG. 22 is a view explaining the structure and the operation of the photoconductive layer, and FIGS. 23A-B are graphs explaining the method of the optical writing using the photoconductive layer.

To be specific, recently the photoconductive layer 34 generally comprises, as shown in FIG. 22, a charge generating layer (CGL) 34a which generates charges by light application, and a charge transfer layer (CTL) 34b which transfers the charges generated in the charge generating layer (CGL) 34a.

When a photo-energy enters the CGL 34a, precursors of charged carriers, having charge moments are generated and are divided into electrons and holes in the presence of electric fields. The CTL 34b is usually formed of a hole-transfer type material, and the holes transfer in the CTL 34b in the presence of electric field formed by electrified charges in the surface of the photosensitizer. When an optical writing device combining a cholesteric liquid crystal and the photoconductive layer 34 is driven, the electrode on the side of the reflection layer is set −, and the electrode on the side of the photoconductive layer 34 is set +.

The photoconductive layer 34 comprises an organic photosensitizer (OPC) or an inorganic material, such as amorphous silicon. The OPC is superior to other photosensitizers in durability, processability and mass productivity, and is removably mounted on flexible media. The OPC has such a lot of merits and is a material which is presently most used.

Next, the display (reflectance) characteristic of the medium combining a cholesteric reflection layer and the photoconductive layer will be explained with reference to FIG. 23.

FIG. 23A is graph of the display characteristics in the drive from the planer state to the focalconic state with light applied and without light applied, which compare both cases with each other.

With light applied, when a voltage pulse signal exceeds a threshold voltage Vtf, the reflection layer goes on changing to the focalconic state. When a voltage at which the reflection layer fully has the focalconic state is Vfc, the focalconic state goes on changing again to the planer state at voltage values exceeding the Vfc.

On the other hand, without no light applied, a threshold voltage Vtf' at which the reflection layer starts to change to the focalconic state, and a voltage Vfc' at which the reflection layer fully has the focalconic state are largely rise in comparison with those with light applied.

Here, in comparison with the respective voltage values between with light applied and without light applied, the voltage value Vfc at which the sufficient focalconic state is obtained with light applied is below the threshold voltage Vtf' of the case without light applied. That is, the application of the voltage value Vfc changes the part the light has been applied to the focalconic state, and the part the light has not been applied to retains the planer state.

FIG. 23B is a graph of the display characteristics in the drive from the focalconic state to the planar state with light applied and without light applied, which compare both cases with each other.

It is assumed that with light applied to, when an applied voltage exceeds Vtp, the liquid crystal goes on changing to the planer state and has the complete planer state when the voltage is Vp.

On the other hand, it is assumed that with no light applied to, when an applied voltage exceed Vtp', the liquid crystal goes on changing to the planer state and has the complete planer state when the voltage is Vp'.

In this case as well, in comparison of the respective voltage values between with light applied and without light applied, the threshold voltage much differs depending on whether or not light is being applied. For example, the general application of the voltage of Vp changes the part where the light is applied to the planer state, but the part without the light application retains the focalconic state.

As described above, conductivity differences taking place in the photoconductive layer after light application make different the electric filed strength to be applied to the liquid crystal between the part the light has been applied to and the part the light has not been applied to for the same applied voltage, whereby the liquid crystal can have different states.

Such optical writing method is described in, e.g., the Japanese published unexamined patent application No. Hei 09-105900, SID 96 Application Digest p. 59, "Reflective Display with Photoconductive Layer and Bistable, Reflective Cholesteric Mixture", Japan Hardcopy 2000, "Electronic Paper using Cholesteric Liquid Crystal, Optical Image Writing with Organic Photosensitizer", etc.

As described above, according to the present embodiment, the threshold voltages of the respective liquid crystal layers are made substantially equal to each other, the display quality and drive stability of the display device can be much improved.

In the present embodiment, the threshold voltages of the liquid crystal layers are controlled by the addition of a surfactant but may be controlled by the addition of a material other than a surfactant. For example, the addition of a trace of an organic solvent (acetone, ethanol or others) has the effect of controlling the threshold voltages. However, a surfactant or a solvent should not be excessively contained, because there is a risk that the excessive content of a surfactant or a solvent will induce the crystallization (deposition) or denaturation of the liquid crystals.

In the present embodiment, the threshold voltages of the liquid crystals are controlled by adding a surfactant to the liquid crystals, but the threshold voltages can be controlled by other means.

For example, liquid crystals which are different in the dielectric constant anisotropy may be blended in suitable amounts to thereby make the threshold voltages equal to each other. The method of controlling the threshold voltages by blending suitable amounts of liquid crystals which are different in the dielectric constant anisotropy will be explained by means of a specific example.

As the R liquid crystal, a liquid crystal of dielectric constant anisotropy $\Delta\varepsilon$ of 6.5 and a liquid crystal of anisotropy $\Delta\varepsilon$ of 1.9 are blended with each other in a ratio of 1:2, and a chiral catalyst CB15 for exciting the right helical structure is mixed in a suitable amount, and the dominant reflection wavelength was arranged to be 492 nm. As the L liquid crystal, a liquid crystal of dielectric anisotropy $\Delta\varepsilon$ of 6.5 and a liquid crystal of anisotropy $\Delta\varepsilon$ of 1.9 are blended with each other in a ratio of 3:2, and a chiral catalyst S811 for exciting the left helical structure is mixed in a suitable amount, and the dominant reflection wavelength was arranged to be 601 nm. The basic structure of the display device is as shown in FIG. 17, and the thicknesses of the respective liquid crystal layers were 3 μm.

The voltage response characteristics were measured on the thus prepared display device. A good characteristic curve having the threshold voltages well agreed with each other was obtained.

Alternate current pulses of 500 V and 100 Hz were applied to the thus-prepared display device, and both liquid crystal layers 22, 26a had the planer state. In the planer state, the color mixture of the two layers produced good white display.

Then, a negative image mask is applied to the surface on the side of the photoconductive layer 34, and while light is being applied, dc pluses of 80 V are applied generally to the device. The two liquid crystal layers 22, 26a in regions the light has been applied to changed to the focalconic state and retained the planer state in regions the light has not been applied to. Vivid black and white display of high contrast could be made.

A SIXTH EMBODIMENT

The display device according to a sixth embodiment of the present invention will be explained with reference to FIG. 24. The same members of the present embodiment as those of the displayed device according to the first to the third embodiments shown in FIG. 3 to 23 are represented by the same reference numbers not to repeat or to simplify their explanation.

Figure 24:
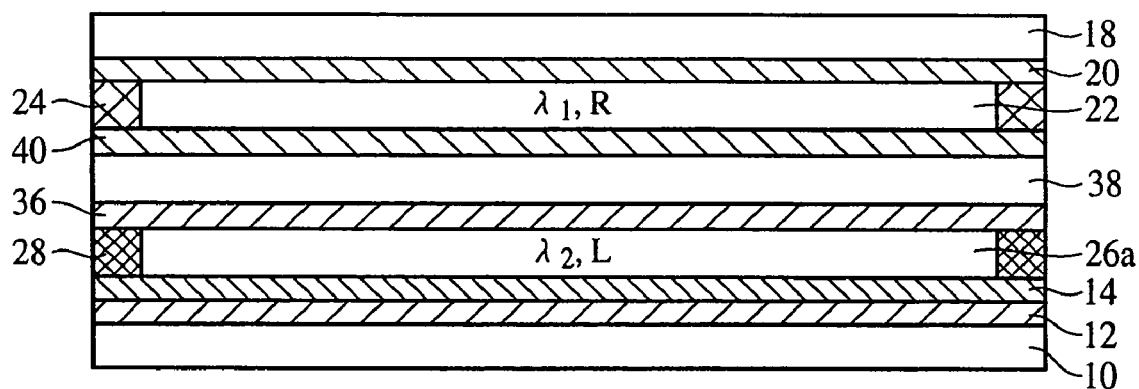
FIG. 24 is a sectional view of the display device according to a sixth embodiment of the present invention, which shows a structure thereof.

FIG. 24 is a sectional view of the display device according to the present embodiment, which shows the structure thereof.

An electrode 12 is formed on a substrate 10. A photo-absorbing layer 14 is formed on the electrode 12. An electrode 36 is formed over the photo-absorbing layer 14, sandwiching a liquid crystal layer 26a of the L liquid crystal therebetween. A substrate 38 is formed on the electrode 36. An electrode 40 is formed on the substrate 38. An electrode 20 is formed over the electrode 40, sandwiching a liquid crystal layer 22 of the R liquid crystal therebetween. A substrate 18 is formed on the electrode 20. The liquid crystal layer 26a and the liquid crystal layer 22 are sealed respectively with seal compounds 28, 24.

As described above, the display device according to the present embodiment is characterized mainly in that the liquid crystal layers 22, 26a are sandwiched respectively by pairs of the electrodes, and the liquid crystal layer 22 and the liquid crystal layer 26a can be driven independently of each other. The display device is thus structured, whereby the liquid crystal layers 22, 26a can be controlled independently in accordance with their respective properties, and the display quality and drive stability can be drastically improved.

The threshold voltages of the liquid crystal layers 22, 26a are not essentially equal to each other, but when in consideration of the peripheral circuits, controllability, etc., it is preferable that the threshold voltages of the respective liquid crystals are substantially equal to each other, as in the display device according to the fifth embodiment.

According to the present embodiment, drive electrodes are formed for each liquid crystal layer, whereby the display quality and drive stability can be drastically improved without considering the influence of the partial voltages of the liquid crystal layers.

In the present embodiment, the display device according to the second embodiment has a pair of electrodes for each liquid crystal layer, but the display device according to the first or the third embodiment may have a pair of electrodes for each liquid crystal layer.

A SEVENTH EMBODIMENT

The display device according to a seventh embodiment of the present invention will be explained with reference to FIGS. 25 to 31. The same members of the present embodiment as those of the display device according to the first to the sixth embodiments shown in FIGS. 3 to 24 are represented by the same reference numbers not to repeat or to simplify their explanation.

In the first to the fourth embodiments, 2 layers which are mutually complementary colors are laminated one on the other between a pair of electrodes to thereby display good white color when both layers have the planer state and display black color when both layer have the focalconic state. This method can provide vivid display of high contrast.

This method is structurally simpler than other various methods. However, this method requires 2 liquid crystal layers to be held between a pair of electrodes, which requires various contrivances as described in, e.g., the fifth and the sixth embodiments. Then, in the present embodiment, a display device which is easier to drive than the display device according to the first to the sixth embodiments will be explained.

Figure 25:
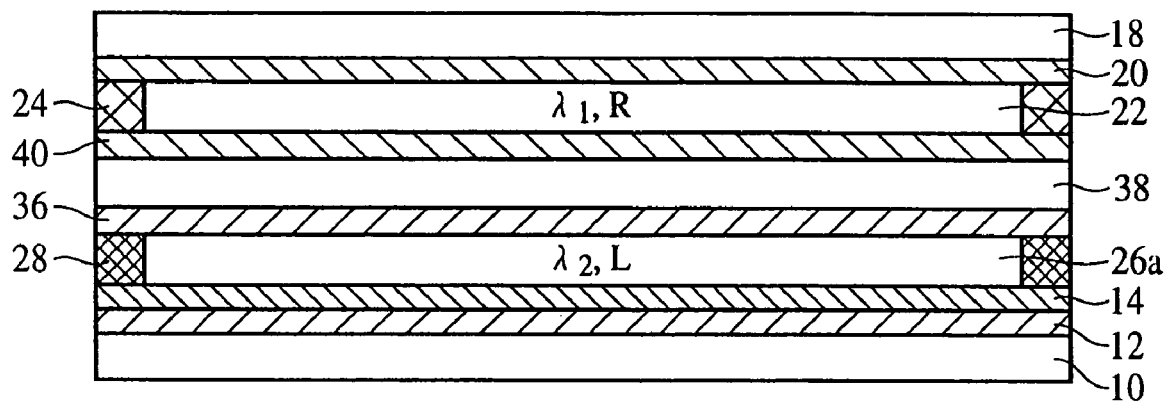
FIG. 25 is a sectional view of the display device according to a seventh embodiment of the present invention, which shows a structure thereof.

First, the liquid crystal display device according to the present embodiment will be explained with reference to FIG. 25. FIG. 25 is a sectional view of the display device according to the present embodiment, which shows a structure thereof.

An electrode 12 is formed on a substrate 10. A photo-absorbing layer 14 is formed on the electrode 12. An electrode 36 is formed over the photo-absorbing layer 14 with a liquid crystal layer 26a of the L liquid crystal interposed therebetween. A substrate 38 is formed on the electrode 36. An electrode 40 is formed on the substrate 38. An electrode 20 is formed over the electrode 40 with a liquid crystal layer 22 of the R liquid crystal interposed therebetween. A substrate 18 is formed on the electrode 20. The liquid crystal layers 26a, 22 are sealed respectively with seal compounds 28, 24.

The liquid crystal layer 22 is blue color layer having the dominant wavelength $\lambda_1$ of the reflection spectra of which is about 450-480 nm. The liquid crystal layer 26a is yellow color layer having the dominant wavelength $\lambda_2$ of the reflection spectra of which is about 570-610 nm. The full width at half maximum of the reflection band of the blue color light on the liquid crystal layer 22 is 70 nm or less.

The display device according to the present embodiment includes such liquid crystal layers 22, 26a and drives the liquid crystal layer 26a with the liquid crystal layer 22 fixed at the planer state or the focalconic state, whereby, based on the additive color mixture, white-blue color display and yellow-black color display are realized.

When the liquid crystal layer 22 has the planer state, and the liquid crystal layer 26a has the planer state, white color display is made, and blue color display is made when the liquid crystal layer 26a has the focalconic state. That is, the white-blue color display can be realized. On the other hand, when the liquid crystal layer 22 has the focalconic state, and the liquid crystal layer 26a has the planer state, yellow display is made, and black color display is made when the liquid crystal layer 26a has the focalconic state. That is, the yellow-black display can be realized.

As described above, the display device according to the present embodiment can change over the display by driving the liquid crystal layer 26a alone. The white-blue color display and the yellow-black display can be switched by only driving the liquid crystal layer 22. Accordingly, the control of the display device can be very simple. It is not necessary to consider relationships between the liquid crystal layer 22 and the liquid crystal layer 26a, such as threshold voltages, etc.

Figure 26:
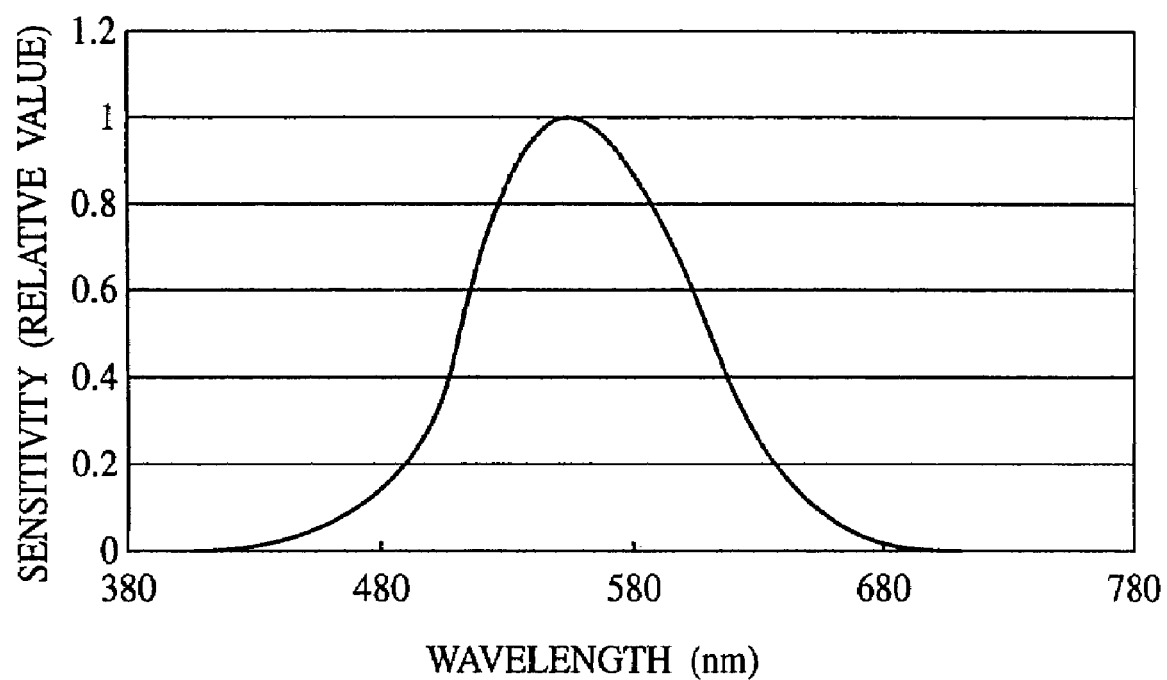
FIG. 26 is a graph of a spectral luminous efficacy curve of the eye of man.

Then, characteristics of the white-blue color display and the yellow-black color display will be explained with reference to FIGS. 26 to 31. FIG. 26 is a spectral luminous efficacy curve of the eye of man. This graph shows that colors which have the same radiation energy but whose wavelength is about 555 nm corresponding to yellowish green color region is most bright to the eye of man, and the visual sensitivity decreases from the wavelength toward the shorter-wavelength side (blue color side) and to the longer-wavelength side (red color side).

Here, one of the 2 liquid crystal layers forming the display device is fixed at the planer state, and the other of the 2 liquid crystal layers is driven, whereby the white-blue color display and the white-yellow color display can be made. In comparing the two displays, it can be intuitively understood that the white-blue color display, which displays letters in blue, which is a cool color, can be read with less psychological stress than the white-yellow color display, which displays letters in yellow, which is a warm color and has lower chroma.

This understanding based on the visibility can be explained based on the small area third color vision abnormality, which is characteristic of man. The small area third color vision abnormality is the phenomena that the sensitivity to blue colors is low in small areas, and colors on the side of short wavelengths are invisible. That is, when small letters are displayed in blue colors, the sensitivity of the eye to the letters is lower, whereby larger contrasts than actually measured can be sensed.

Based on the above, it can be understood that the white-blue color display has more advantages than the white-yellow display and is next to the white-black display in the visibility.

Then, it is theoretically explained that a narrower reflection band of blue color can finally provide higher contrast.

Figure 27:
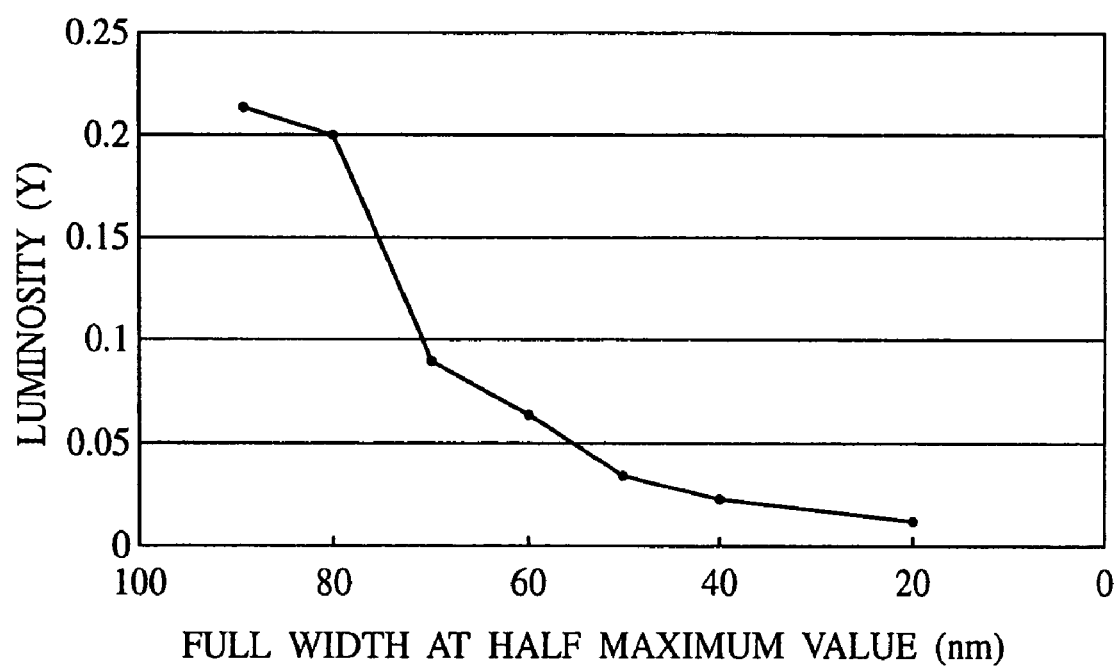
FIG. 27 is a graph of relationships between the width of the reflection band of the blue color layer and the luminosity of blue color.

A simulation of the white color display with an about 90 nm full width at half maximum value of the yellow layer and a full width at half maximum value of the blue color layer as a parameter was made. FIG. 27 shows the result of computation of the luminosity of the blue color layer for the reflection band (the full width at half maximum value) of the blue color layer as a parameter. As shown, as the reflection band of the blue color layer is decreased, the eyes of man feel darker. That is, it is shown that letters can be displayed thick.

Figure 28:
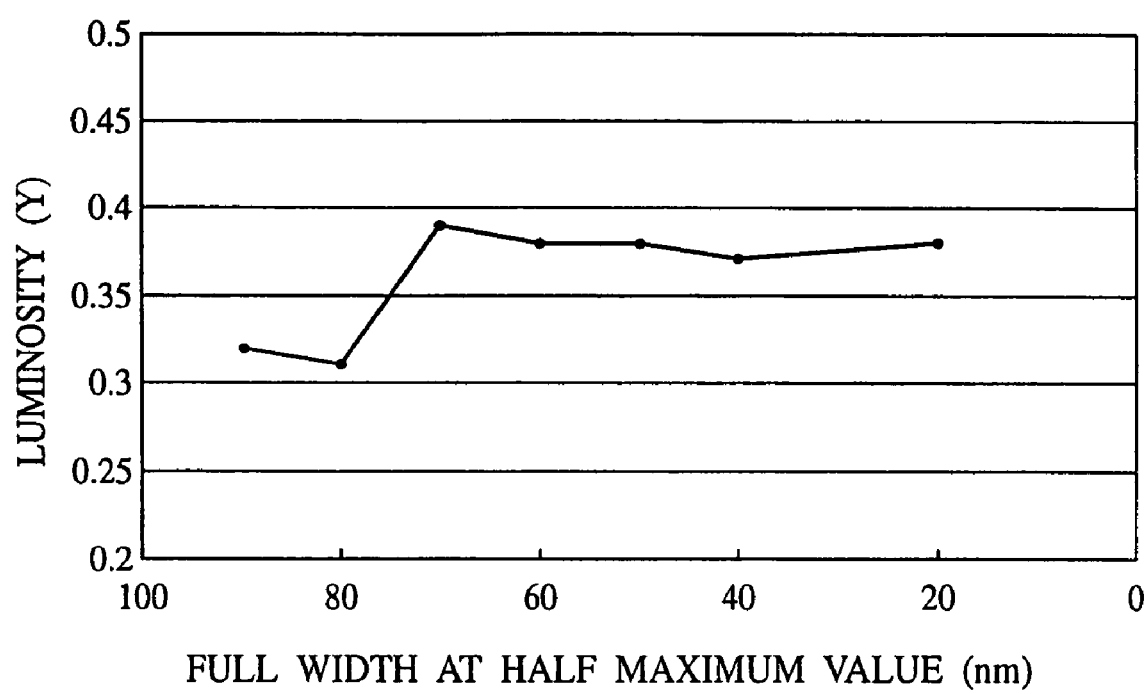
FIG. 28 is a graph of relationships between the width of the reflection band of the blue color layer and the luminosity of white color.

The computation result shows that even with the full width at half maximum value of the yellow color layer changed, good white color display can be obtained after laminated. That is, as shown in FIG. 28, the luminosity of the white color given by the color mixture was not decreased and was substantially constant.

Figure 29:
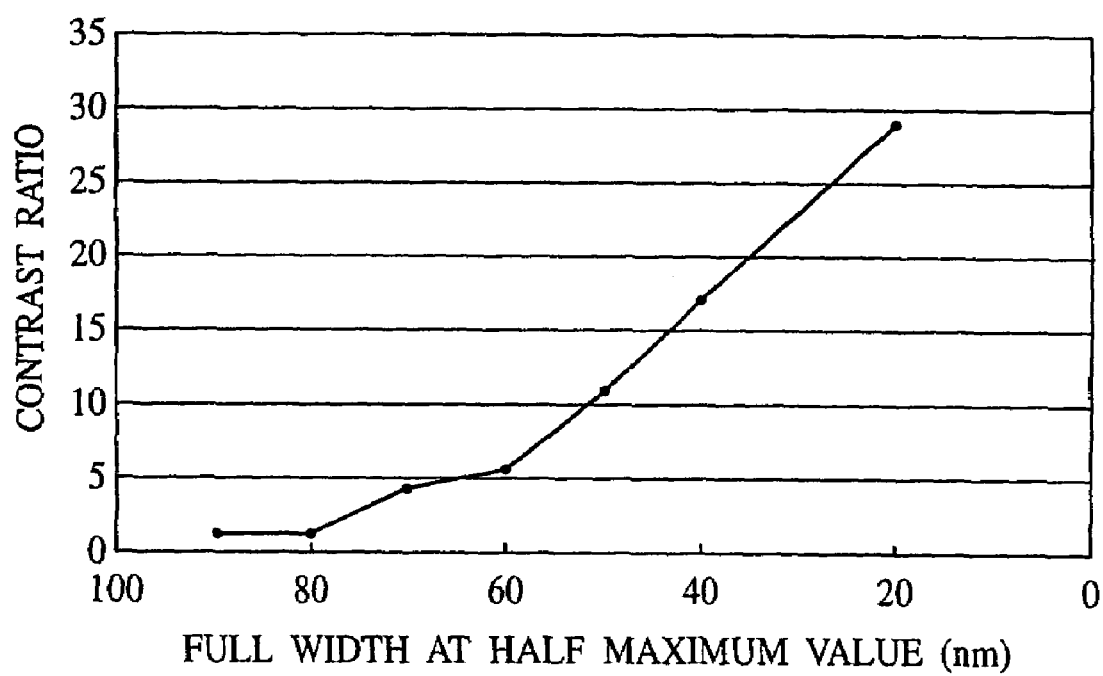
FIG. 29 is a graph of relationships between the width of the reflection band of the blue color layer and the contrast.

FIG. 29 is a graph of the contrast of the white-blue color display at that time. As shown, as the full width at half maximum value of the blue color layer is smaller, the blue is darker, and the contrast is better. Oppositely, as the full width at half maximum value of the blue color layer is above about 70 nm, the contrast is less than 5, and the visibility is lower.

Based on the above, it has been shown that the reflection band of the yellow color layer is wider, the reflection band of the blue color layer is narrower, whereby good white-blue color display can be obtained. That is, in the case that only one of the liquid crystal layers is driven to switch the display, it is preferable to use the blue color layer as the fixed layer and the yellow color layer as the drive layer.

On the other hand, the blue color layer of the 2 layers forming the display device is fixed at the focalconic state, and the yellow color layer is used in the drive, whereby the yellow-black color display is possible. Yellow color, which can be sensed by the vision of man among hues at low chroma because of the visional characteristic of man, gives, upon display, less stress due to the hue than other hues, such as red, green blue, etc., and the display having good visibility.

Figure 30:
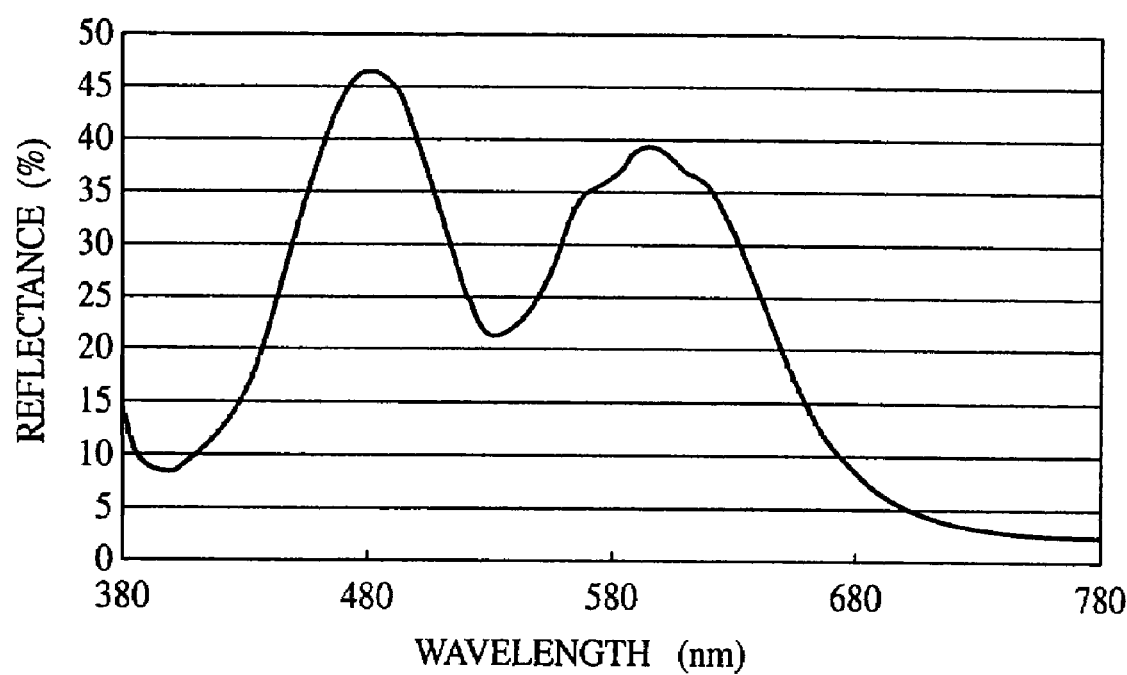
FIG. 30 is a graph of reflection spectra of the white color of the display device according to the seventh embodiment of the present invention.
Figure 31:
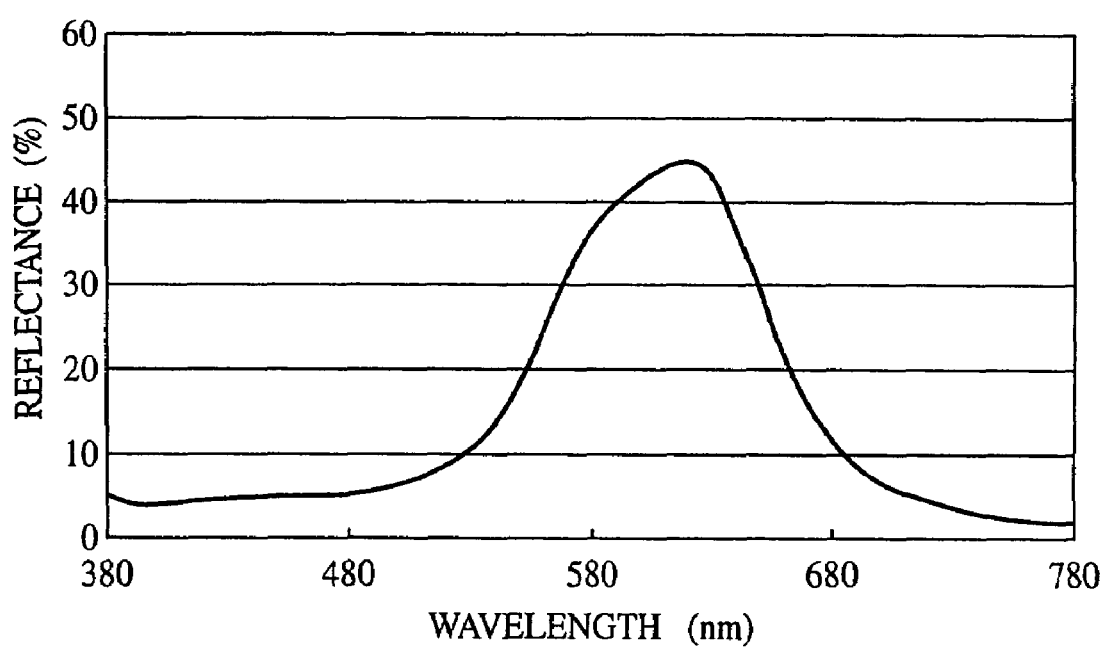
FIG. 31 is a graph of reflection spectra of the yellow color of the display device according to the seventh embodiment of the present invention.

The evaluation result of the display device according to the present embodiment will be explained. FIG. 30 is a graph of reflection spectra of white color in the display device according to the present embodiment. FIG. 31 is a graph of reflection spectra of yellow color in the display device according to the present embodiment.

The liquid crystal layer 22 was formed of the R liquid crystal which was prepared by mixing a suitable amount of a chiral catalyst CB15, which excites the right helical structure, in a nematic liquid crystal of $\Delta n=0.25$ and had an about 480 nm-dominant reflection wavelength. The full width at half maximum value of the reflection band of the liquid crystal layer 22 was about 70 nm. The liquid crystal layer 26a was formed of the L liquid crystal which was prepared by mixing a suitable amount of a chiral catalyst S811, which excites the left helical structure, in a nematic liquid crystal, and had a $\Delta n=0.33$ and had an about 590 nm-dominant reflection wavelength. The full width at half maximum value of the reflection band of the liquid crystal layer 26a was about 105 nm. The thicknesses of the liquid crystal layer 22 and the liquid crystal layer 26a were respectively 3 µm.

The display device shown in FIG. 25 was formed by using the thus-adjusted liquid crystals, ac pulses of 50 V, 100 Hz were applied respectively between the electrode 20 and the electrode 40 and between the electrode 36 and the electrode 12 to place the liquid crystal layers 22, 26a into the planer state. In this state, the reflection spectra were measured, and the reflection spectra shown in FIG. 30 were given. x=0.318, y=0.322 and Y=0.406 are obtained, and the color mixture of the 2 layers gave good white color display.

Then, ac pulses of 20V, 100 Hz were applied between the electrode 36 and the electrode 12 to place the liquid crystal layer 26a in the focalconic state. In this state reflection spectra were measured, and good blue color display could be given.

The contrast ratio was about 18, and although the background color is not white, vivid images of high contrast could be given.

Then, ac pulses of 20V, 100 Hz were applied between the electrode 20 and the electrode 40 to place the liquid crystal layer 22 into the focalconic state, and ac pulses of 50 V, 100 Hz were applied between the electrode 36 and the electrode 12 to place the liquid crystal layer into the planer state. In this state, the reflection spectra were measured, and the reflection spectra as shown FIG. 31 were given. x=0.518, y=0.424 and Y=0.324 are obtained, and bright yellow display was given.

As described above, according to the present embodiment, a blue color layer having the dominant wavelength $\lambda_1$ of the reflection spectra of which is about 450-480 nm is used as the first liquid crystal layer, the yellow color layer having the dominant wavelength $\lambda_2$ of the reflection spectra of which is about 570-610 nm is used as the second liquid crystal layer, the yellow color layer alone is used as the main drive layer, whereby the display device which can make good white color display by the simple structure and the simpler drive method can be realized.

The blue color layer is driven, whereby the white-blue color display and the yellow-black color display can be easily switched. The full width at half maximum value of the reflection band of blue light on the blue color layer is 70 nm or below, whereby the white-blue color display and the black-yellow color display of good visibility can be made.

AN EIGHTH EMBODIMENT

The display device according to an eighth embodiment of the present invention will be explained with reference to FIG. 32. The same members of the present embodiment as those of the display device according to the first to the seventh embodiment shown in FIGS. 3 to 31 are represented by the same reference numbers not repeat or to simplify their explanation.

Figure 32:
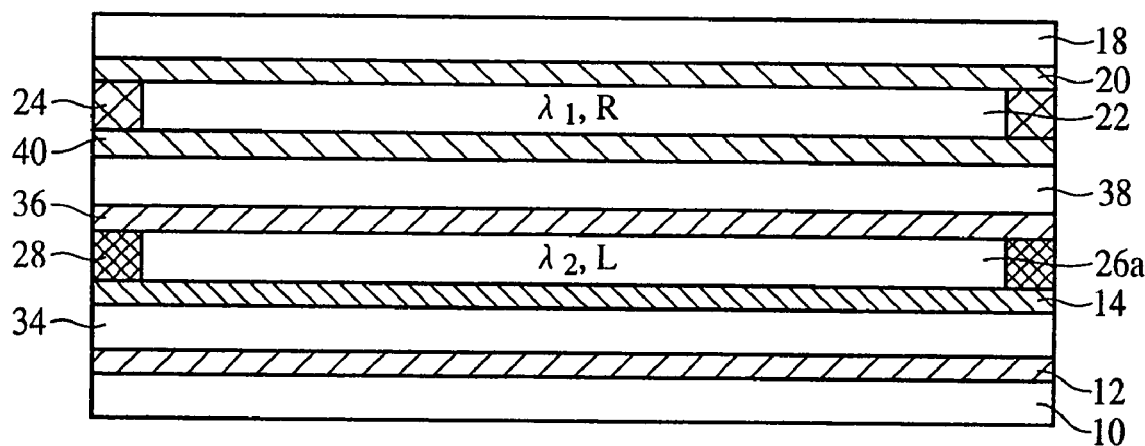
FIG. 32 is a sectional view of the display device according to an eighth embodiment of the present invention, which shows a structure thereof.

FIG. 32 is a sectional view of the display device according to the present embodiment, which shows the structure thereof.

The display device according to the present embodiment is the same in the basic structure as the display device according to the seventh embodiment shown in FIG. 25. The display device according to the present embodiment is characterized in that a photoconductive layer 34 is provided between the electrode 12 and the liquid crystal layer 26a as shown in FIG. 32. The presence of the photoconductive layer 34 permits the display device according to the seventh embodiment to optically write images.

Next, the evaluation result of the display device according to the present embodiment will be explained.

The liquid crystal layer 22 was formed of the R liquid crystal having an about 480 nm-dominant reflection wavelength prepared by mixing a suitable amount of a chiral catalyst CB15, which excites the right helical structure, in a nematic liquid crystal of $\Delta n=0.25$. The full width at half maximum value of the reflection band of the liquid crystal layer 22 was about 70 nm. The liquid crystal layer 26a was formed of the L liquid crystal having an about 590 nm-dominant reflection wavelength prepared by mixing a suitable amount of a chiral catalyst S811, which excites the left helical structure, in a nematic liquid crystal of $\Delta n=0.33$. The full width at half maximum value of the reflection band of the liquid crystal layer 26a was about 105 nm. The thicknesses of the liquid crystal layer 22 and the liquid crystal layer 26a were respectively 3 μm. The thickness of the photoconductive layer 34 was generally 10 μm.

The display device shown in FIG. 32 was formed of the thus adjusted liquid crystals, and ac pulses of 50V, 100 Hz were applied between the electrode 20 and the electrode 40 to place the liquid crystal layer 22 into the planer state.

Next, with an image mask applied to the surface on the side of the photoconductive layer 34, dc rectangular waves of 120 V were applied between the electrode 36 and the electrode 12, whereby the liquid crystal layer 26a in the regions of the device where the light has been applied changed into the planer state, and the liquid crystal layer 26a in the regions where the light has not been applied changed into the focalconic state. Positive images of the white-blue color display of good visibility could be provided.

On the other hand, dc rectangular waves of 50 V were applied between the electrode 36 and the electrode 12, whereby the liquid crystal layer 26a in the regions of the device where the light has been applied changed into the focalconic state, and the liquid crystal layer 26a in the region where the light has not been applied changed into the planer state. Negative images of the white-blue color display of good visibility could be provided.

The contrast ratio was about 6.5, and the display of the level of newspapers, which can be seen without stress could be provided.

Then, ac pulses of 20 V, 100 Hz were applied between electrode 20 and the electrode 40 to place the liquid crystal layer 22 into the focalconic state.

Next, with an image mask on the surface on the side of the photoconductive layer 34, dc pulses of 100 V were between the electrode 36 and the electrode 12, whereby the liquid crystal layer 26a in the regions of the device where the light has not been applied changed into the planer state, and the liquid crystal layer 26a in the regions where the light has not been applied changed into the focalconic state. Positive images of the yellow-black color display of good visibility could be provided.

On the other hand, dc pulses of 50 V were applied between the electrode 36 and the electrode 12, whereby the liquid crystal layer 26a in the regions of the device where the light has not been applied changed into the focalconic state, and the liquid crystal layer 26a in the regions where the light has not been applied changed into the planer state. Negative images of the yellow-black color display of good visibility could be provided.

The contrast ratio was about 18, and although the background was not white, vivid images of high contrast could be provided.

As described above, according to the present embodiment, a blue color layer having the dominant wavelength $\lambda_1$ of the reflection spectra of which is about 450-480 nm is used as the first liquid crystal layer, the yellow color layer having the dominant wavelength $\lambda_2$ of the reflection spectra of which is about 570-610 nm is used as the second liquid crystal layer, and the yellow color layer alone is used as the main drive layer, whereby the display device which can make good white color display by the simple structure and the simpler drive method can be realized. The optical writing using the photoconductive layer permits the white-blue color display and the black-yellow color display of good visibility to be made.

A NINTH EMBODIMENT

The display device according to a ninth embodiment of the present invention will be explained with reference to FIGS. 33 and 34. The same members of the present embodiment as those of the display device according to the first to the seventh embodiments shown in FIGS. 3 to 32 are represented by the same reference numbers not to repeat or to simplify their explanation.

Figure 33:
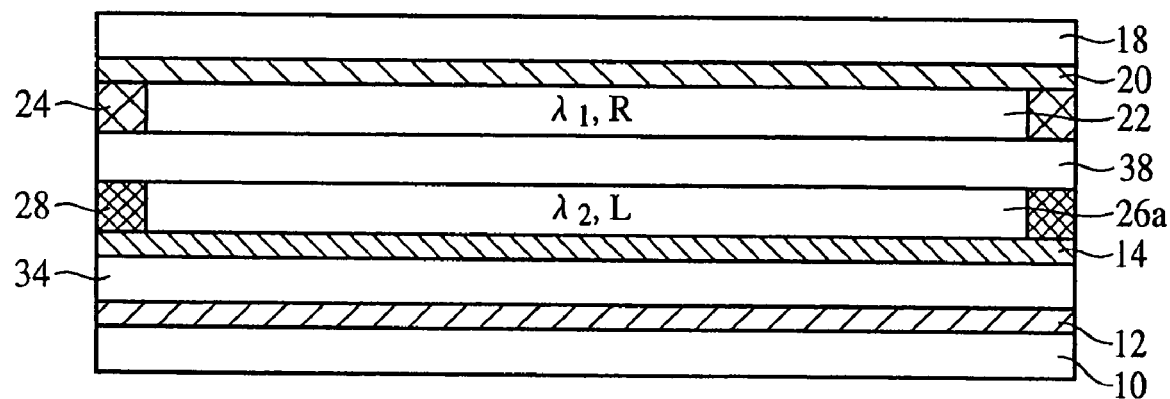
FIG. 33 is a sectional view of the display device according to a ninth embodiment of the present invention, which shows a structure thereof.

FIG. 33 is a sectional view of the display device according to the present embodiment, which shows a structure thereof. FIG. 34 is a view one example of a suitable ratio of partial voltages to be applied to the respective layers when a voltage is applied between the electrodes.

The display device according to the seventh and the eighth embodiments includes a pair of electrodes (the electrodes 20, 40) for driving the liquid crystal layer 22, and a pair of electrodes (the electrodes 12, 36) for driving the liquid crystal layer 26a. The display device can be arranged to make the white-blue color display and the yellow-black color display by using one pair of drive electrodes. In the present embodiment, such display device will be explained.

An electrode 12 is formed on a substrate 10. A photoconductive layer 34 which generates charges by the application of light is formed on the electrode 12. A photo-absorbing layer 14 is formed on the photoconductive layer 34. A partition layer 16 is formed over the photo-absorbing layer 14 with a liquid crystal layer 26a of the L liquid crystal interposed therebetween. An electrode 20 is formed over the partition layer 16 with a liquid crystal layer 22 of the R liquid crystal interposed therebetween. A substrate 18 is formed on the electrode 20. The liquid crystal layer 26a and the liquid crystal layer 22 are sealed respectively with seal compounds 28, 24.

The display device according to the present embodiment is arranged to divide as follows a voltage applied to the respective layer.

Figure 34:
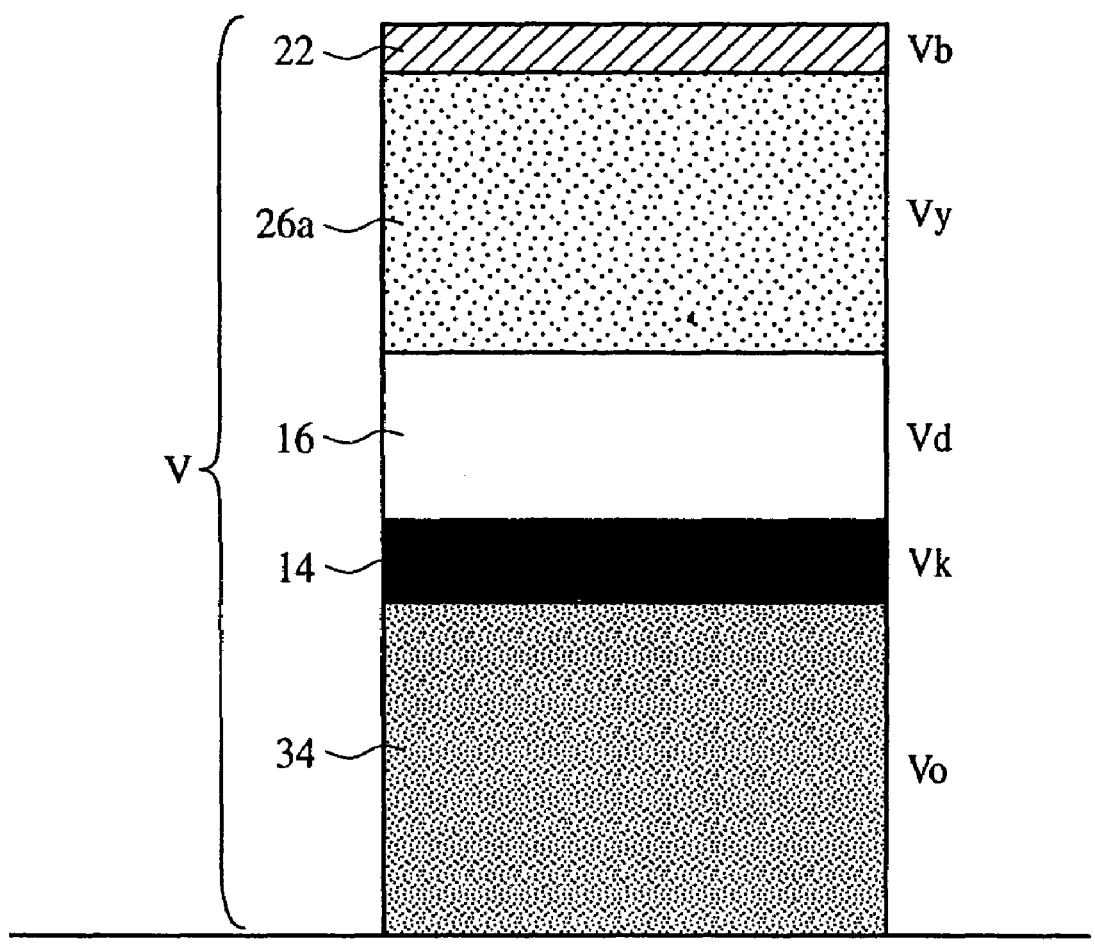
FIG. 34 is a view of one example of suitable ratio of partial voltages applied to the respective layers given when a voltage is applied between the electrodes.
Figure 35A:
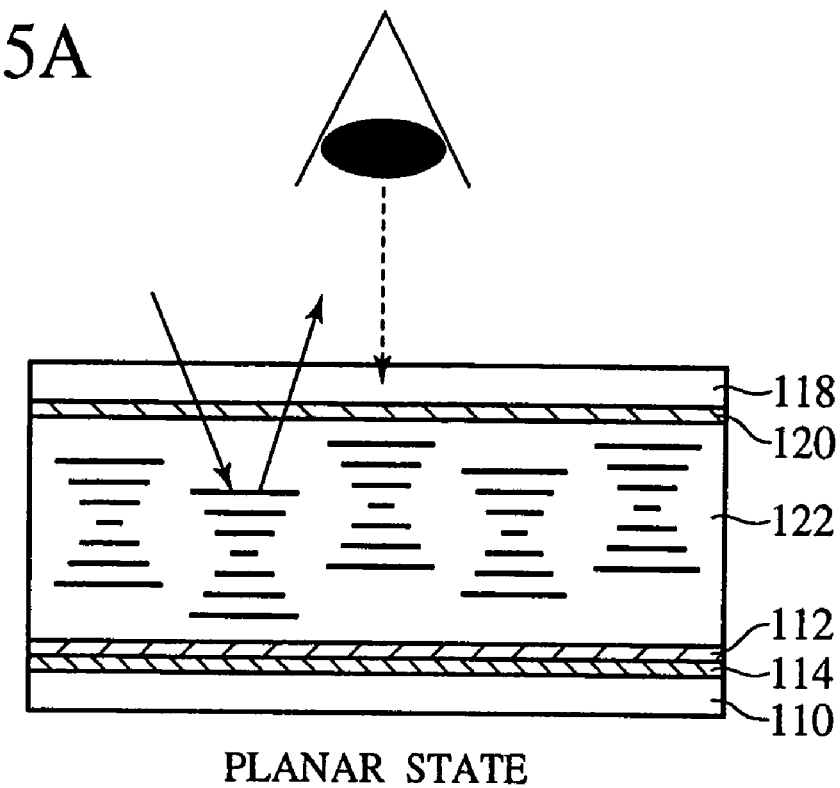
FIGS. 35A-B are diagrammatic views of the proposed display device using a chiral nematic liquid crystal.
Figure 35B:
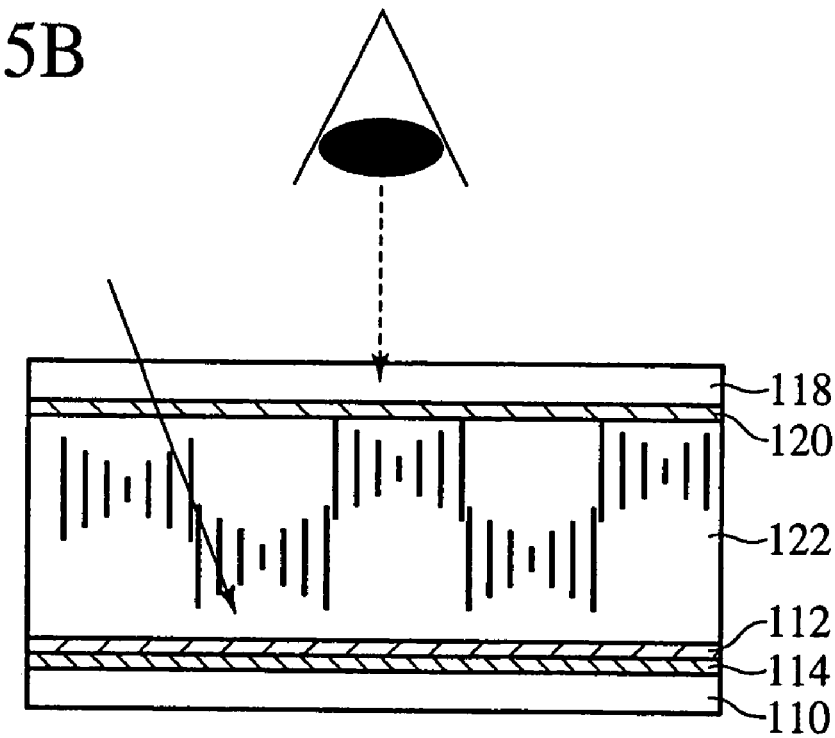
Figure 36:
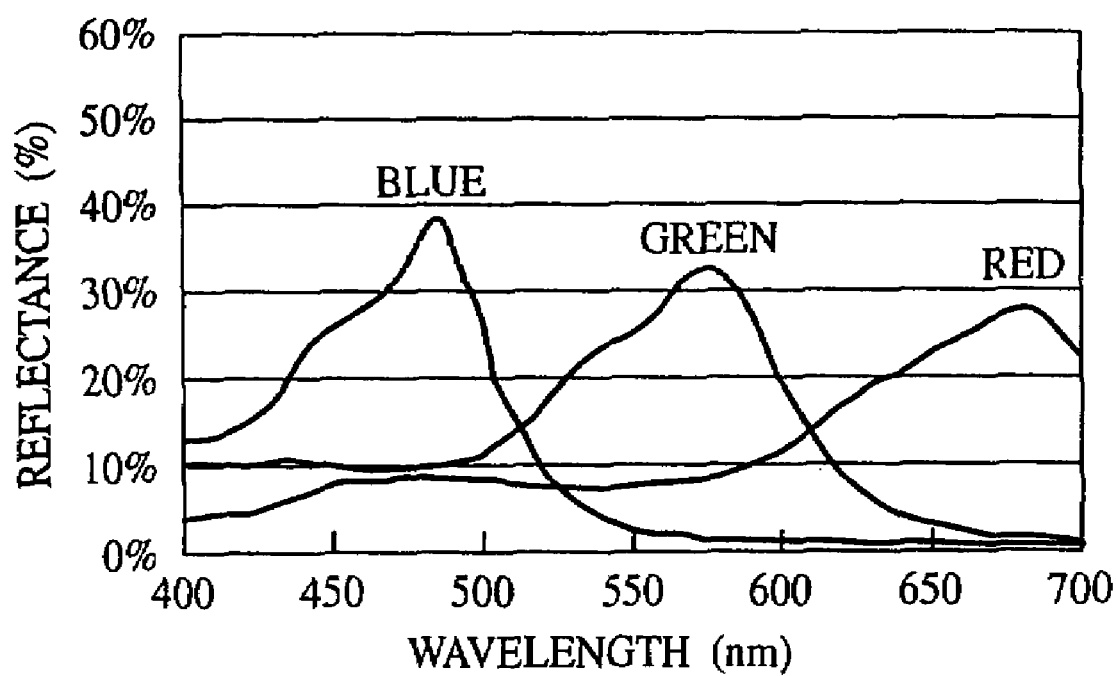
FIG. 36 is a graph of reflection spectra of the chiral nematic liquid crystal.
Figure 37:
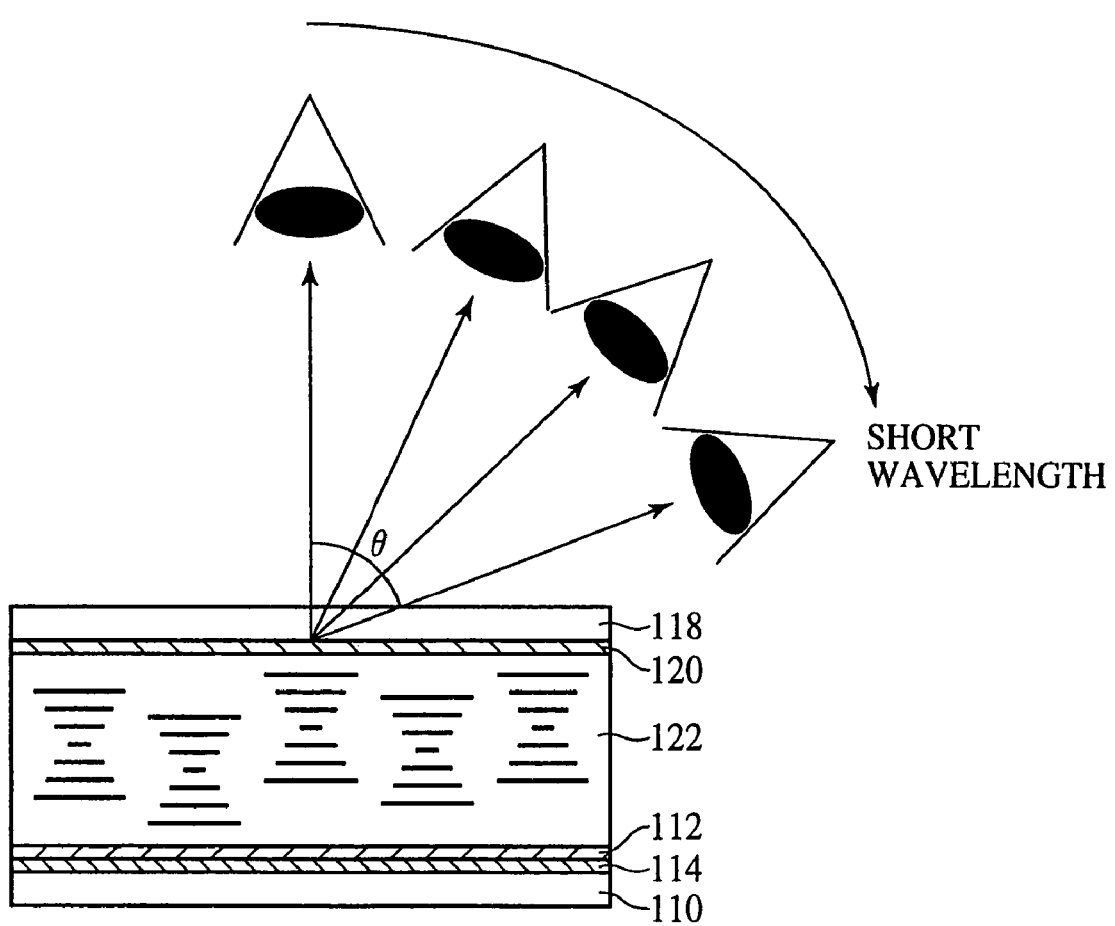
FIG. 37 is a schematic view as watched in different observation directions.

FIG. 34 show one example of the suitable ratio of partial voltages of a voltage applied between the electrode 12 and the electrode 20 divided to the respective layers. In this figure, the ratio of the thicknesses of the respective layers indicates the partial voltage ratio of the voltage.

It is preferable that as a voltage Vo to be applied to the photoconductive layer 34, many voltages are applied to increase display/non-display contrast of letters and the S/N ratio (display noises). Oppositely, it is preferable that the partition layer 16 and the photo-absorbing layer 14 are formed of materials of dielectric constants as high as possible to thereby suppress the voltages Vd, Vk and the ratios of the partial voltages to the layers as low as possible. The voltage Vb to be applied to the liquid crystal layer 22 is made lower than the voltage Vy to be applied to the liquid crystal layer 26a. The resistivity of the liquid crystal layer 22 can be made lower by adding an additive, such as a surfactant or others, to the liquid crystal layer 22 to thereby lower the ratio of the partial voltage applied to the liquid crystal layer 22.

The partial voltage ratio of the partial voltages applied to the respective layers is thus controlled, whereby the liquid crystal layer 26a can be selectively driven by the voltage applied between the electrode 12 and the electrode 30, and the display states can be switched. The liquid crystal layer 22 can be also driven by applying a high voltage between the electrode 12 and the electrode 20, whereby the white-blue color display and the yellow-black color display can be switched.

The liquid crystal layer 22, whose resistivity is lower, requires, for the drive, a voltage which is far higher than a drive voltage required for printing. However, the white-blue color display and the yellow-black color display will not be frequently switched, and practically there is no problem.

The evaluation result of the display device according to the present embodiment will be explained.

The liquid crystal layer 22 was formed of the R liquid crystal having an about 480 nm-dominant reflection wavelength which was prepared by mixing a suitable amount of a chiral catalyst CB15, which excites the right helical structure, in a nematic liquid crystal of $\Delta n=0.25$. A surfactant was added by about 4% to this R liquid crystal to thereby much decrease the resistivity.

The liquid crystal layer 26a was formed of the L liquid crystal having an about 590 nm-dominant reflection wavelength which was prepared by mixing a suitable amount of a chiral catalyst S811, which excites the left helical structure, in a nematic liquid crystal of $\Delta n=0.33$.

The thicknesses of the liquid crystal layer 22 and the liquid crystal layer 26a were respectively 3 μm. The thickness of the photoconductive layer 34 was generally 12 μm.

The display device shown in FIG. 33 was formed of the thus-adjusted liquid crystals, and then with an image mask applied to the surface on the side of the photoconductive layer 34, dc pulses of 500 V were applied between the electrode 12 and the electrode 20, whereby both the liquid crystal layer 22 and the liquid crystal layer 26a were initialized into the planer state.

Then, with an image mask applied to the surface on the side of the photoconductive layer 34, dc pulses of 150 V were applied between the electrode 12 and the electrode 20, whereby the liquid crystal layer 26a regions where the light has been applied changed into the focalconic state, and positive images of the white-blue color display of good visibility could be provided.

With an image mask applied to the surface on the side of the photoconductive layer 34, dc pulses of 300 V were applied between the electrode 12 and the electrode 20, whereby the liquid crystal layer 22 and the liquid crystal layer 26a were initialized into the focalconic state and the planer state, respectively.

Then, with an image mask applied to the surface on the side of the photoconductive layer 34, dc pulses of 180 V were applied between the electrode 12 and the electrode 20, whereby the liquid crystal layer 26a regions where the light has been applied changed into the focalconic state, and positive images of the yellow-black color display of good visibility could be provided.

As described above, in the display device according to the present embodiment including a first liquid crystal layer is formed of a blue color layer having an bout 450-480 nm-dominant wavelength $\lambda_1$ of the reflection spectra and a second liquid crystal layer is formed of a yellow color layer having an about 570-610 nm-dominant wavelength $\lambda_2$ of the reflection spectra, and using the yellow color layer alone as the drive layer, the partial voltage ratios of voltages to be applied to the first liquid crystal layer and the second liquid crystal layer are much differed, which permits the display device to include a pair of drive electrodes. The display device according to the present embodiment can have further simpler structure than the display device according to the seventh and the eighth embodiments.

MODIFIED EMBODIMENTS

The present invention is not limited to the above-described embodiments and can cover other various modifications.

For example, in the above-described embodiments, the liquid crystal layer of a selective reflection wavelength $\lambda_1$ is disposed on the side of the observation, the liquid crystal layer of a selective reflection wavelength $\lambda_2$ is disposed on the side of the photo-absorbing layer 14, but it is possible that the liquid crystal layer of a selective reflection wavelength $\lambda_2$ is disposed on the side of the observation, and the liquid crystal layer of a selective reflection wavelength $\lambda_1$ is disposed on the side of the photo-absorbing layer 14.

In the above-described embodiments, the chiral namatic liquid crystals of the liquid crystal layers were changed from the focalconic state to the planer state by applying a voltage between the electrodes 12, 20. However, the voltage application is not essential to change the chiral nematic liquid crystals from the focalconic state to the planer state. For example, the application of heat, mechanical stresses or others can change the chiral nematic liquid crystals from the focalconic state to the planer state.

In the first and the third embodiments, all the liquid crystal layers are formed of the R liquid crystal but may be formed of the L liquid crystal.

In the second embodiment, the modification of the third embodiment, and the fifth to the ninth embodiments, the liquid crystal layer of the R liquid crystal of a selective reflection wavelength $\lambda_1$ is disposed on the side of the observation, and the liquid crystal layer of the L liquid crystal of a selective reflection wavelength $\lambda_2$ is disposed on the side of the photo-absorbing layer 14. However, it is possible that a liquid crystal layer of the L liquid crystal of a selective wavelength $\lambda_1$ is disposed on the side of the observation, and a liquid crystal layer of the R liquid crystal of a selective reflection wavelength $\lambda_2$ is disposed on the side of the photo-absorbing layer 14.

In the above-described fourth embodiment, all the liquid crystal layers are micro-capsuled, but at least one of the liquid crystal layers may be micro-capsuled. Micro-capsuling at least one of the liquid crystal layers can prevent a plurality of the liquid crystal layers from mixing with each other.

The above-described fourth embodiment includes the liquid crystal layer of the R liquid crystal of a selective reflection wavelength $\lambda_1$ and the liquid crystal layer of the L liquid crystal of a selective reflection wavelength $\lambda_2$ but may include a liquid crystal layer of the R liquid crystal of a selective reflection wavelength $\lambda_1$, a liquid crystal layer of the L liquid crystal of a selective reflection wavelength $\lambda_1$, a liquid crystal layer of the R liquid crystal of a selective reflection wavelength $\lambda_2$ and a liquid crystal layer of the L liquid crystal of a selective reflection wavelength $\lambda_2$. Thus, bright white color display can be provided.

In the fifth, the eighth and the ninth embodiments, writing is performed by using the photoconductive layer. However, as in the display device according to the first to the fourth embodiments, image display made performed by using the voltage alone applied between the electrode 12 and the electrode 20.

In the fifth, the eighth and the ninth embodiments, the photoconductive layer is used to form regions of one liquid crystal layer, which have different states. However, in the first to the fourth embodiments, the sixth embodiment and the seventh embodiment as well, regions of one liquid crystal layer having different states can be formed, and in this case, at least one of a pair of electrodes for driving the liquid crystals is formed in, e.g., a matrix so as to apply drive voltages to required regions. Otherwise, the display device according to the first to the third embodiments, and the sixth and the seventh embodiments may include a photoconductive layer to display images by the method of optical writing.

In the fifth to the ninth embodiments, the substrates are exemplified by plate-like substrates, but films may be used as in the third embodiment.

The above-described embodiments have been explained by means of examples using chiral nematic liquid crystals, but chiral nematic liquid crystals are not essential. Liquid crystals which are able to selectively reflect incident light can be used. For example, liquid crystals, such as cholesteric liquid crystal, etc., which can have the cholesteric phase, can be used.

In the above-described embodiments, liquid crystals are used, but liquid crystals are not essentially used. For example, electrophoretic particles may be used, or twist balls may be used. Electrophoretic particles and twist balls are described in, e.g., Nikkei Microdevices, February, 2001.

INDUSTRIAL APPLICABILITY

In the display device according to the present invention in which light reflected by first reflection means, and light reflected by a second reflection means are mixed by additive color mixture, and the colors are displayed, light of a first wavelength to be reflected by the first reflection means, and light of a second wavelength to be reflected by the second reflection means mutually have a complementary color relationship, whereby good white and black display can be realized by a simple structure and a simple drive method. Accordingly, the display device can usefully have low electric power consumption, and memorization ability.

The invention claimed is:

1. A method for driving a display device displaying a color by mixing light reflected by a first liquid crystal region and light reflected by a second liquid crystal region by additive color mixture, wherein a dominant wavelength of the light reflected by the first liquid crystal region is in one of a range of 450-500 nm and a range of 570-640 nm, a dominant wavelength of the light reflected by the second liquid crystal region is in the other of the range of 450-500 nm and the range of 570-640 nm, the light reflected by the first liquid crystal region, and the light reflected by the second liquid crystal region have a substantially mutually complementary color relationship, and a reflection band of the first liquid crystal region and the second liquid crystal region, which reflects light on a side of shorter wavelengths being narrower than a reflection band of the first liquid crystal region and the second liquid crystal region which reflects light on a side of longer wavelengths, in which a display state of the first reflection element and a display state of the second reflection element being both changed to switch between a white color display and a black color display.

2. A method for driving a display device displaying a color by mixing light reflected by a first liquid crystal region and light reflected by a second liquid crystal region by additive color mixture, wherein a dominant wavelength of the light reflected by the first liquid crystal region is in one of a range of 450-500 nm and a range of 570-640 nm, a dominant wavelength of the light reflected by the second liquid crystal region is in the other of the range of 450-500 nm and the range of 570-640 nm, the light reflected by the first liquid crystal region, and the light reflected by the second liquid crystal region have a substantially mutually complementary color relationship, and a reflection band of the first liquid crystal region and the second liquid crystal region, which reflects light on a side of shorter wavelengths being narrower than a reflection band of the first liquid crystal region and the second liquid crystal region which reflects light on a side of longer wavelengths, in which a display state of the first reflection element being fixed, and a display state of the second reflection element being changed to switch between a white color display and a blue color display or between a yellow color display and a black color display.

3. A method for driving a display device according to claim 2, wherein the display state of the first reflection element is changed to switch between a white-blue color display and a yellow-black color display.

* * * * *

UNITED STATES PATENT AND TRADEMARK OFFICE
CERTIFICATE OF CORRECTION

PATENT NO.       : 7,554,516 B2                                    Page 1 of 1
APPLICATION NO. : 11/327723
DATED            : June 30, 2009
INVENTOR(S)      : Nose et al.

It is certified that error appears in the above-identified patent and that said Letters Patent is hereby corrected as shown below:

On the Title Page: item (56),

OTHER PUBLICATIONS

Add the following publication:

Makow, David M., "Peak Reflectance and Color Gamut of
       Superimposed Left- and Right- Handed Cholesteric Liquid
       Crystals," Applied Optics Vol. 19, No. 8, pp. 1274-1277.

Signed and Sealed this

Second Day of February, 2010

David J. Kappos
*Director of the United States Patent and Trademark Office*